(12) United States Patent
Shteynberg et al.

(10) Patent No.: US 7,952,294 B2
(45) Date of Patent: May 31, 2011

(54) APPARATUS, SYSTEM AND METHOD FOR CASCADED POWER CONVERSION

(75) Inventors: Anatoly Shteynberg, San Jose, CA (US); Harry Rodriguez, Gilroy, CA (US); Bradley M. Lehman, Belmont, MA (US)

(73) Assignee: Exclara, Inc., Santa Clara, CA (US)

( * ) Notice: Subject to any disclaimer, the term of this patent is extended or adjusted under 35 U.S.C. 154(b) by 655 days.

(21) Appl. No.: 12/098,443

(22) Filed: Apr. 6, 2008

(65) Prior Publication Data
US 2009/0251934 A1 Oct. 8, 2009

(51) Int. Cl.
*H05B 37/00* (2006.01)
(52) U.S. Cl. .................. 315/224; 315/227 R; 315/307; 315/308; 323/282
(58) Field of Classification Search .......... 315/307, 315/308, 291, 224, 227 R, 240, 242, 241 R, 315/243, 244; 323/282, 285, 284, 234, 265
See application file for complete search history.

(56) References Cited

U.S. PATENT DOCUMENTS

| | | | | |
|---|---|---|---|---|
| 5,498,936 A | * | 3/1996 | Smith | 315/247 |
| 5,747,943 A | * | 5/1998 | Houk et al. | 315/225 |
| 6,229,292 B1 | * | 5/2001 | Redl et al. | 323/285 |
| 7,642,762 B2 | * | 1/2010 | Xie et al. | 323/282 |

* cited by examiner

*Primary Examiner* — David Hung Vu
(74) *Attorney, Agent, or Firm* — Nancy R. Gamburd; Gamburd Law Group LLC

(57) ABSTRACT

An apparatus method and system are provided for power conversion, to supply power to a nonlinear load such as a plurality of light emitting diodes. An exemplary apparatus comprises a first power converter stage, a second power converter stage, a plurality of sensors such as first and second sensors, and a controller. The first power converter stage includes a power switch and a first inductor having a first inductance. The first and second sensors are both coupled to a common reference node, with the first sensor adapted to sense a first parameter of the first power converter stage, and the second sensor adapted to sense the output current level. The second power converter stage includes a second inductor having a second inductance, and is couplable to provide an output current to the nonlinear load such as LEDs. The controller is coupled to the power switch, the first sensor and the second sensor, and the controller is adapted to turn the power switch into an on state for an on-time duration substantially proportional to a ratio of the second inductance to the first inductance.

70 Claims, 14 Drawing Sheets

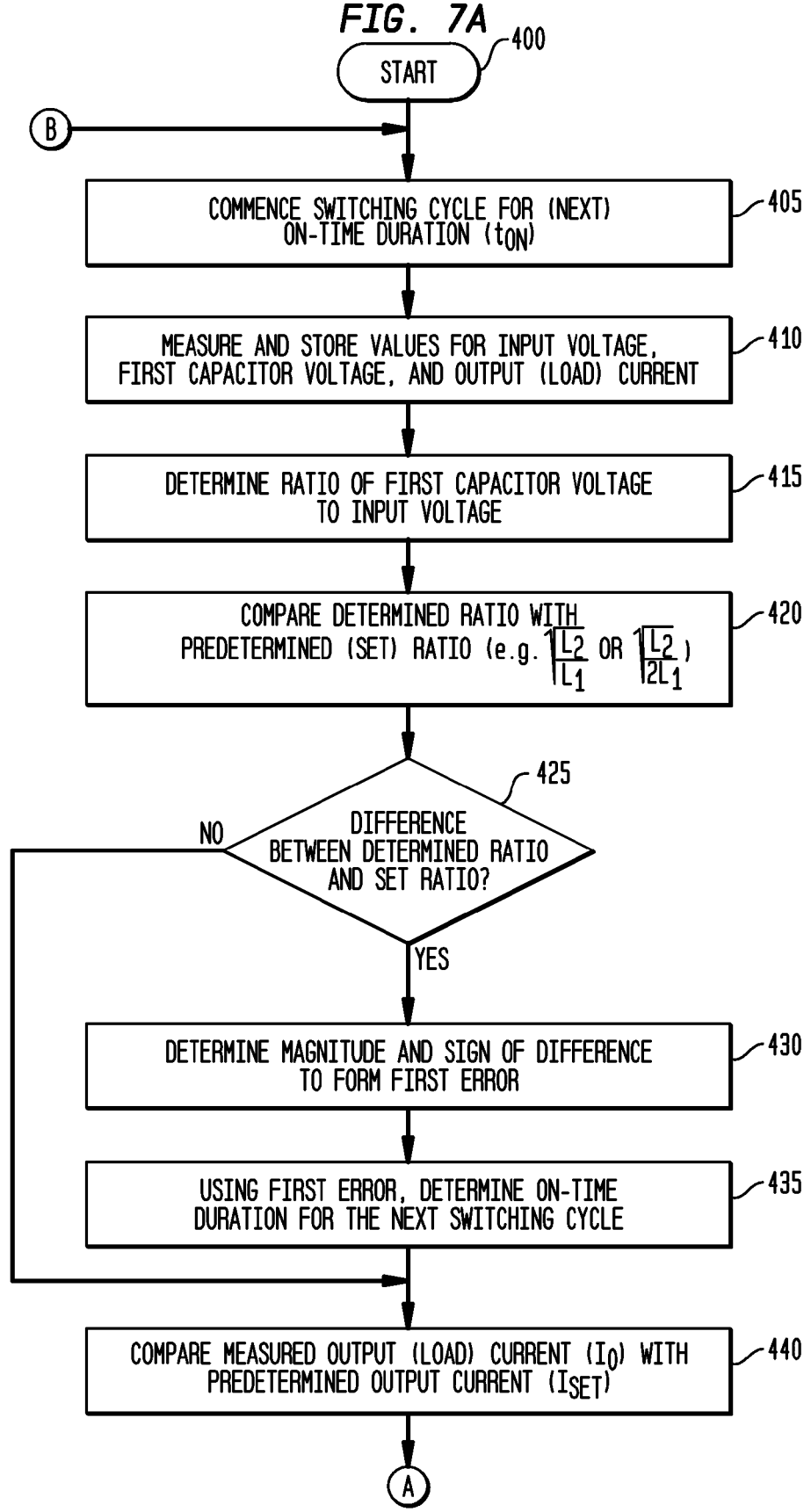

APPARATUS, SYSTEM AND METHOD FOR CASCADED POWER CONVERSION

FIELD OF THE INVENTION

The present invention in general is related to power conversion, and more specifically, to a system, apparatus and method for providing a two-stage, cascaded power converter for driving nonlinear loads, such as light emitting diodes ("LEDs").

BACKGROUND OF THE INVENTION

A wide variety of off-line LED drivers are known. For example, a capacitive drop off-line LED driver from On Semiconductor (Application Note AND8146/D) is a non-isolated driver with low efficiency, is limited to delivering relatively low power, and at most can deliver a constant current to the LED with no temperature compensation, no dimming arrangements, and no voltage or current protection for the LED.

Other isolated off-line LED drivers also have wide-ranging characteristics, such as a line frequency transformer and current regulator (On Semiconductor Application Note AND 8137/D); a current mode controller (On Semiconductor Application Note AND8136/D); a white LED luminary light control system (U.S. Pat. No. 6,441,558); LED driving circuitry with light intensity feedback to control output light intensity of an LED (U.S. Pat. No. 6,153,985); a non-linear light-emitting load current control (U.S. Pat. No. 6,400,102); a flyback as an LED Driver (U.S. Pat. No. 6,304,464); a power supply for an LED (U.S. Pat. No. 6,557,512); a voltage booster for enabling the power factor controller of a LED lamp upon a low AC or DC supply (U.S. Pat. No. 6,091,614).

In general, these various LED drivers are overly-complicated, such as using secondary side signals (feedback loops) which have to be coupled with the controller primary side across the isolation provided by one or more transformers. Many utilize a current mode regulator with a ramp compensation of a pulse width modulation ("PWM") circuit. Such current mode regulators require relatively many functional circuits, and nonetheless continuing to exhibit stability problems when used in the continuous current mode with a duty cycle or ratio over fifty percent. Various prior art attempts to solve these problems utilized a constant off time boost converter or hysteric pulse train booster. While these prior art solutions addressed problems of instability, these hysteretic pulse train converters exhibit other difficulties, such as electromagnetic interference, inability to meet other electromagnetic compatibility requirements, and are comparatively inefficient. Other attempts, such as in U.S. Pat. Nos. 6,515,434 B1 and 6,747,420, provide solutions outside the original power converter stages, adding additional feedback and other circuits, which render the LED driver even larger and more complicated.

Widespread proliferation of solid state lighting systems (semiconductor, LED-based lighting sources) created a demand for highly efficient power converters, LED Drivers, with high conversion ratios of input to output voltages. In order to reduce the component count, such converters may be constructed without isolation transformers, and instead using two-stage converters with the second stage running at a very low duty cycle, thereby limiting the maximum operating frequency, resulting in an increase in the size of the converter (due to the comparatively low operating frequency), and ultimately defeating the purpose of removing coupling transformers.

Various proposals to solve these problems have included use of quadratic power converters for providing a low output voltage with a wide DC conversion range, such as the quadratic power converter 10 illustrated in FIG. 1. For example, in "Switching Converter with Wide DC Conversion Range" (D. Maksimovic and S. Guk, May 1989 HFPC Proceedings and also in IEEE Transactions on Power Electronics, Vol. 6, No. 1, January 1991), the authors suggested using PWM converters having a single switch and featuring voltage conversion ratios with a quadratic dependence of the duty cycle. The cascaded buck and buck-boost topologies were designed and analytically synthesized for controlling the output voltage. When these circuits are used as a current source, however, they become as inadequate as conventional one-stage converters, and exhibit even more problems when used with a sinusoidal input current. For example, these circuits require a large capacitive filter following the rectified AC signal, to continuously provide a DC output, thereby making power factor correction ("PFC") practically impossible.

Referring to FIG. 1, the input DC voltage Vg (11) is applied to the first stage (buck-boost converter), consisting of transistor 20 (controlled by some type of controller 21), first inductor 15, capacitor 16 and diode 12. When the transistor 20 is conducting, for a linear (non-saturating) inductor 15, current is building substantially linearly in the inductor 15, while diode 12 is blocked by the reverse voltage during this portion of the cycle. When the transistor 20 is off, energy stored in the inductor 15 discharges into capacitor 16, diode 12 is forward biased and conducting during part of the off time (discontinuous mode of operation, "DCM") or completely during the off time (continuous mode of operation, "CCM"), and the on-off cycle is repeated. The secondary stage is illustrated as a buck converter and consists of the transistor 20, capacitor 18, second inductor 14, and diodes 13 and 17, with the load (illustrated as resistor 19) connected across capacitor 18. When the transistor 20 is conducting, energy from capacitor 16 is being transferred to the load and output capacitor 18 via inductor 14, also charging it linearly, while diode 13 is conducting and diode 12 is blocked. When the transistor 20 is off and not conducting, diode 13 is reverse biased, and diode 17 is conducting, discharging inductor 14 into output capacitor 18. The operational process of buck converter also may be either DCM or CCM. The transfer ratio of the converter 10 is $$-\frac{D^2}{1-D},$$

where D is duty cycle, with the minus sign denoting that the polarity of the output voltage is reversed compared to the input voltage. Also, currents in transistor 20 and the output load are flowing in opposite direction, creating a difficult topology for sensing operational signals and providing corresponding feedback signals (e.g., both nodes "A" and "B" are at return potentials).

This prior art quadratic converter is designed to work as a voltage converter with a wide conversion ratio. Were this converter 10 to be used for current control in the output load, however, various issues may arise, such as due to any imbalance of charges, voltages across capacitors 16 and 18 may not match, creating an excessive voltage across capacitor 16, which leads either to an overdesign of the power stage or low reliability must be tolerated, because this converter 10 cannot work if the voltage across capacitor 16 is greater than Vg. For the same reason, this converter 10 cannot be used in the AC/DC topologies requiring power factor correction.

Another proposed solution in U.S. Pat. No. 6,781,351, illustrated in FIG. 2, addressed the PFC problem, providing AC/DC cascaded power converters having high DC conversion ratios and improved AC line harmonics, with low input harmonic currents, a comparatively high power factor, and efficient operation for low voltage DC outputs. These converters, however, like the quadratic converters, have floating operational signals, which are referenced to different nodes of the power stage. Such floating operational signals make the provision of feedback signals to a controller extremely difficult, effectively requiring custom, application-specific controllers for power management.

The input 31 is an AC voltage, rectified by a bridge 32 and further filtered by a small capacitor 33. The buck-boost first stage 44 includes a blocking diode 34, which allows normal operation of the buck boost 44 at any value of input voltage (at node 45), thereby creating an opportunity to provide power factor correction if the on-time of the switch 40 is relatively constant. The second stage, a buck converter, consists of capacitor 42, inductor 39 and diodes 38 and 41, and works substantially the same as the buck converter discussed with reference to FIG. 1. In order to prevent an uncontrollable rise of the voltage across the first stage capacitor 36, the converter uses additional components, a coupled inductor and an additional diode (not illustrated), which negatively affects the economics of the converter 30. A more sophisticated control technique than PWM, also described in the patent, may address the imbalance of the capacitors' charge and prevent a high voltage at the first capacitor stage, without adding additional components to the power stage. Though the prior art converter 30 is improved compared to the prior art converter 10 because it can operate off line using an AC input, it still has floating operational signals, requiring excessively complicated feedback connections to the PWM controller 46.

Accordingly, a need remains to provide a high conversion ratio converter to generate a controlled output current with input and output operational signals, referenced to the same node, such as ground, to provide a capability for improved feedback signals to a controller. Such a converter should be optimized to run using DC input voltages, as well as AC, using a systematized design procedure. In addition, such a converter should provide significant power factor correction when connected to an AC line for input power. Also, it would be desirable to provide a LED driver controller for such a converter, included within a system for controlling a cascaded switching power converter, constructed and arranged for supplying power to one or plurality of LEDs, including for high brightness applications, providing an overall reduction in the size and cost of the LED driver.

SUMMARY OF THE INVENTION

The exemplary embodiments of the present invention provide numerous advantages for supplying power to non-linear loads, such as LEDs. The exemplary embodiments are capable of sustaining a plurality of types of control over such power delivery, such as providing a substantially constant current output, a hysteretic current output, and overshoot protection on start up. The exemplary embodiments utilize a plurality of sensors which are all referenced to a common reference node, such as ground, delivering improved feedback signals and allowing for simpler and more robust control electronics, which further enables more accurate and fine-tuned control over power delivery and circuit protection, and enables an overall reduction in the size and cost of the converter. The exemplary embodiments ensure a close-to-unity power factor when connected to an AC line for input power, and further generate negligible harmonics or other forms of electromagnetic interference.

A first exemplary embodiment provides an apparatus for power conversion, in which the apparatus is couplable to a nonlinear load. The nonlinear load may be a plurality of light emitting diodes. The exemplary apparatus comprises: a first power converter stage comprising a power switch and a first inductor, the first inductor having a first inductance; a first sensor coupled to the first power converter stage and coupled to a common reference node, the first sensor adapted to sense a first parameter of the first power converter stage; a second power converter stage coupled to the first power converter stage, the second power converter stage comprising a second inductor, the second inductor having a second inductance, the second power converter stage couplable to provide an output current to the nonlinear load; a second sensor coupled to the common reference node and couplable to the nonlinear load, the second sensor adapted to sense the output current level; and a controller coupled to the power switch, the first sensor and the second sensor, the controller adapted to turn the power switch into an on state for an on-time duration substantially proportional to a ratio of the second inductance to the first inductance. The controller may be coupled to the power switch through a buffer circuit.

In an exemplary embodiment, the on-time duration is substantially proportional to either a square root of the ratio of the second inductance to the first inductance or to a square root of one-half of the ratio of the second inductance to the first inductance. In another exemplary embodiment, a ratio of the on-time duration to an off-time duration is substantially constant and substantially proportional to either a square root of the ratio of the second inductance to the first inductance or a square root of one-half of the ratio of the second inductance to the first inductance.

The first parameter may be an input voltage level. In this exemplary embodiment, the first power converter stage further comprises a first capacitor, and wherein the apparatus further comprises a third sensor coupled to the first power converter stage and adapted to sense a first capacitor voltage level, and the controller is further adapted to determine a first error substantially as a difference between the input voltage level and the first capacitor voltage level, and to use the first error to adjust the on-time duration of a next switching cycle. The controller also may be further adapted to determine a second error substantially as a difference between the output current level and a predetermined output current level and to use the second error to adjust the on-time duration of the next switching cycle. The first error may be determined in a comparatively fast feedback loop of the controller and the second error may be determined in a comparatively slow feedback loop of the controller.

In another exemplary embodiment, the first power converter stage further comprises a first capacitor, the apparatus further comprises a third sensor coupled to the first power converter stage and adapted to sense a first capacitor voltage level, and the controller is further adapted to determine a voltage ratio of the input voltage level and the first capacitor voltage level, to determine a first error substantially as a difference between the voltage ratio and a predetermined ratio substantially proportional to the first and second inductance, and to use the first error to adjust the on-time duration of a next switching cycle.

In an exemplary embodiment, the first power converter stage further comprises a first capacitor, the apparatus further comprises a third sensor coupled to the first power converter stage and adapted to sense a first capacitor voltage level, and the controller is further adapted to determine a voltage ratio of the input voltage level and the first capacitor voltage level, to determine a first error substantially as a difference between the voltage ratio and a predetermined ratio, and to use the first error to adjust the on-time duration of a next switching cycle, wherein the predetermined ratio is substantially proportional to either a square root of the ratio of the second inductance to the first inductance or a square root of one-half of the ratio of the second inductance to the first inductance.

The controller may be further adapted to integrate the input voltage level, and when the integrated voltage level is substantially equal to a difference between the sensed output current level and a predetermined output current level, to turn the power switch into an off state for an off-time duration proportional to a difference between the switching cycle time and the on-time duration.

In an exemplary embodiment, a switching cycle time is substantially constant and substantially proportional to a minimum input voltage substantially sufficient for both the first power converter stage and the second power converter stage to operate in a critical conduction mode. In another exemplary embodiment, the controller also may be adapted to vary the on-time duration comparatively slowly over a plurality of switching cycles to provide a power factor substantially close to one.

The controller may be further adapted to maintain the output current provided by the second power converter stage between a first threshold and a second threshold by incrementing or decrementing a next on-time duration by an amount $\Delta t_{on}$, wherein $\Delta t_{on}$ is substantially proportional to $$\text{Int}\left[\frac{\beta}{n}t_{on}\right]+1,$$

in which $\beta$ is a numeric parameter, n is a number of switching cycles for the output current to change between the first and second thresholds, and $t_{on}$ is the current on-time duration. This exemplary embodiment is particularly suited for hysteretic control over output current levels.

The exemplary apparatus may further comprise a third sensor coupled to the second power converter stage and adapted to sense a second stage output current level, wherein the controller is further adapted to turn the power switch into an off state when the sensed second stage output current level has reached substantially a predetermined peak current level, to determine an actual on-time duration of the current cycle, and when the sensed second stage output current level has decreased substantially to zero, and to determine an actual switching time period and reset time period of the current switching cycle. This exemplary embodiment is particularly suited for overshoot control over output current levels during start up. In addition, the controller may be further adapted to determine the on-time duration $t_{on0}$ for a next switching cycle, wherein $t_{on0}$ is substantially proportional to $$t_{on}\sqrt{\frac{2I_O T_0}{I_{ps}t_{rs}}},$$

where $t_{on}$ is the on-time duration of the current switching cycle, $I_O$ is a predetermined output current level, $I_{ps}$ is the predetermined peak current level, $T_0$ is the actual switching time period of the current switching cycle, and $t_{rs}$ is the reset time period of the current switching cycle.

In an exemplary embodiment, the first sensor is a first resistor and the second sensor is a second resistor, and the first and second resistors are coupled to the common reference node having a ground potential. The first power converter stage may further comprise: a first diode couplable to an input voltage and coupled to the first inductor; a first capacitor coupled to the power switch; and wherein the power switch is coupled to the first inductor, the first capacitor, and the first resistor. In an exemplary embodiment, the second power converter stage is coupled to the power switch through the first resistor. The second power converter stage may further comprise: a second diode coupled to the second inductor; a second capacitor coupled to the second diode and couplable to the nonlinear load; and wherein the second resistor is coupled to the first resistor at the common reference node. The first power converter stage may further comprises a third diode coupled between the first capacitor and the first inductor, and wherein the second power converter stage further comprises a fourth diode coupled between the second inductor and the first capacitor. An exemplary apparatus may further comprise a rectifier coupled to the first diode, coupled to the common reference node, and couplable to receive an AC input voltage.

Additional embodiments may include a fourth sensor coupled to the power switch and adapted to sense a first stage current level, and may include a fifth sensor coupled to the second inductor and adapted to sense a second stage current level. In exemplary embodiments, the first parameter may be at least one of the following parameters: an input voltage level, a first capacitor voltage level, or a first stage current level.

Another exemplary embodiment includes a method of providing power conversion for a nonlinear load using a power converter comprising a power switch and a first power converter stage coupled to a second power converter stage, the first power converter stage comprising a first inductor having a first inductance and the second power converter stage comprising a second inductor having a second inductance. The exemplary method comprises: sensing a first parameter of the first power converter stage with reference to a common potential; turning on the power switch for an on-time duration of a switching cycle and providing an output current to the nonlinear load, the on-time duration substantially proportional to a ratio of the second inductance to the first inductance; and sensing the output current level with reference to the common potential.

The on-time duration may be substantially proportional to either a square root of the ratio of the second inductance to the first inductance or to a square root of one-half of the ratio of the second inductance to the first inductance. A ratio of the on-time duration to an off-time duration may be substantially constant and substantially proportional to either a square root of the ratio of the second inductance to the first inductance or a square root of one-half of the ratio of the second inductance to the first inductance. The first parameter may be an input voltage level.

The exemplary method may further comprise: sensing a first capacitor voltage level of the first power converter stage; determining a first error substantially as a difference between the input voltage level and the first capacitor voltage level; and using the first error, adjusting the on-time duration of a next switching cycle. The method may also further comprise: determining a second error substantially as a difference between the output current level and a predetermined output current level; and using the second error, adjusting the on-time duration of the next switching cycle.

In an exemplary embodiment, the method may further comprise: sensing a first capacitor voltage level of the first power converter stage; determining a voltage ratio of the input voltage level and the first capacitor voltage level; determining a first error substantially as a difference between the voltage ratio and a predetermined ratio proportional to the first and second inductance; and using the first error, adjusting the on-time duration of a next switching cycle. In another exemplary embodiment, the method may further comprise: sensing a first capacitor voltage level of the first power converter stage; determining a voltage ratio of the input voltage level and the first capacitor voltage level; determining a first error substantially as a difference between the voltage ratio and a predetermined ratio, the predetermined ratio proportional to either a square root of the ratio of the second inductance to the first inductance or a square root of one-half of the ratio of the second inductance to the first inductance; and using the first error, adjusting the on-time duration of a next switching cycle.

In another exemplary embodiment, the method may further comprise: integrating the input voltage level; and when the integrated voltage level is substantially equal to a difference between the sensed output current level and a predetermined output current level, turning the power switch into an off state for an off-time duration substantially proportional to a difference between a switching cycle time and the on-time duration.

The exemplary method also may include maintaining a switching cycle time substantially constant and substantially proportional to a minimum input voltage, wherein the minimum input voltage is substantially sufficient for both the first power converter stage and the second power converter stage to operate in a critical conduction mode.

In another exemplary embodiment, the method may further comprise: maintaining the output current provided by the second power converter stage between a first threshold and a second threshold by incrementing or decrementing a next on-time duration by an amount $\Delta t_{on}$, wherein $\Delta t_{on}$ is substantially proportional to $$\text{Int}\left[\frac{\beta}{n} t_{on}\right] + 1,$$

in which $\beta$ is a numeric parameter, n is a number of switching cycles for the output current to change between the first and second thresholds, and $t_{on}$ is the current on-time duration. This exemplary embodiment is particularly suited for hysteretic control over output current levels.

In an exemplary embodiment, the method may further comprise: sensing a second stage output current; turning the power switch into an off state when the sensed second stage output current level has reached substantially a predetermined peak current level; determining an actual on-time duration of a current switching cycle; and when the sensed second stage output current level has decreased substantially to zero, determining an actual switching time period and reset time period of the current switching cycle. This exemplary embodiment is particularly suited for overshoot control over output current levels during start up. In addition, the method may further comprise determining the on-time duration $t_{on0}$ for a next switching cycle as substantially proportional to $$t_{on}\sqrt{\frac{2I_O T_0}{I_{ps} t_{rs}}},$$

where $t_{on}$ is the on-time duration of the current switching cycle, $I_O$ is a predetermined output current level, $I_{ps}$ is the predetermined peak current level, $T_0$ is the actual switching time period of the current switching cycle, and $t_{rs}$ is the reset time period of the current switching cycle.

The exemplary method may include rectifying an AC input voltage. The method may also include other features, such as sensing a first stage current level with reference to the common potential, and/or sensing a second stage current level with reference to the common potential. In addition, the first parameter may be at least one of the following parameters: an input voltage level, a first capacitor voltage level, or a first stage current level. The exemplary method may also provide for varying the on-time duration comparatively slowly over a plurality of switching cycles to provide a power factor substantially close to one.

Another exemplary embodiment is a system for power conversion, with the system couplable to receive an input voltage. The exemplary system comprises: a plurality of light emitting diodes; a first power converter stage comprising a power switch, a first capacitor, and a first inductor, the first inductor having a first inductance; a first sensor coupled to the first power converter stage and coupled to a common reference node, the first sensor adapted to sense a first parameter of the first power converter stage; a second power converter stage coupled to the first power converter stage, the second power converter stage comprising a second inductor and a second capacitor, the second inductor having a second inductance, the second power converter stage coupled to the plurality of light emitting diodes to provide an output current to the plurality of light emitting diodes; a second sensor coupled to the common reference node and to the plurality of light emitting diodes, the second sensor adapted to sense the output current level; and a controller coupled to the power switch, the first sensor and the second sensor, the controller adapted to turn the power switch into an on state for an on-time duration substantially proportional to a ratio of the second inductance to the first inductance. The exemplary system embodiment may also include any or all of the features and elements discussed above.

Another exemplary embodiment provides an apparatus for power conversion, with the apparatus couplable to a plurality of light emitting diodes and couplable to receive an input voltage. The exemplary apparatus comprises: first, a first power converter stage comprising: a power switch; a first capacitor coupled to the power switch; a first inductor coupled to the power switch, the first inductor having a first inductance; and a first diode couplable to the input voltage and coupled to the first inductor; second, a first resistor coupled to the power switch and coupled to a common reference node couplable to a ground potential; third, a second power converter stage coupled to the first power converter stage, the second power converter stage couplable to provide an output current to the plurality of light emitting diodes, with the second power converter stage comprising: a second inductor having a second inductance; a second diode coupled to the second inductor and couplable to the plurality of light emitting diodes; and a second capacitor coupled to the second diode and couplable to the plurality of light emitting diodes; a second resistor coupled to the common reference node and couplable to the plurality of light emitting diodes; and a controller coupled to the power switch, the first resistor and the second resistor, the controller adapted to turn the power switch into an on state for an on-time duration substantially proportional to a ratio of the second inductance to the first inductance.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 5, divided into

DETAILED DESCRIPTION OF EXEMPLARY EMBODIMENTS

Figure 1:
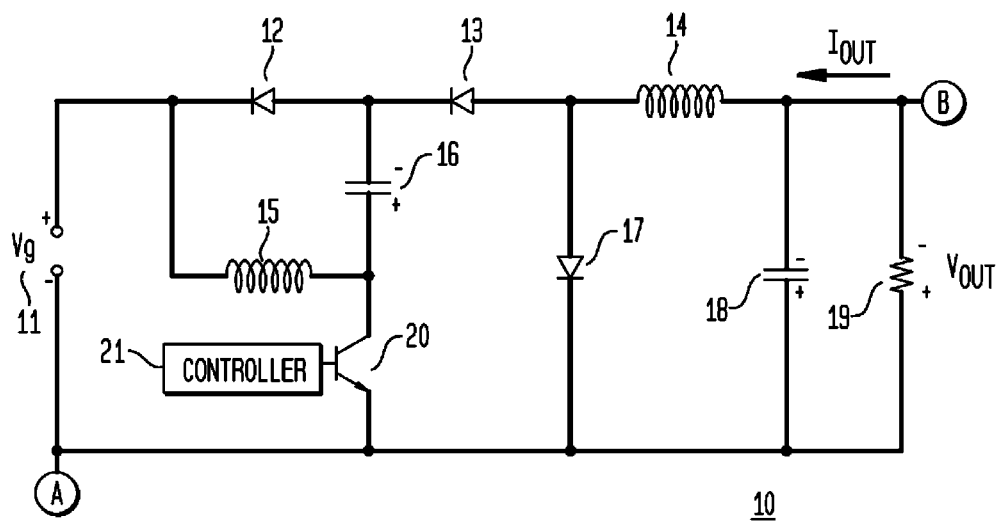
FIG. 1 is a circuit diagram illustrating a prior art quadratic converter.
Figure 2:
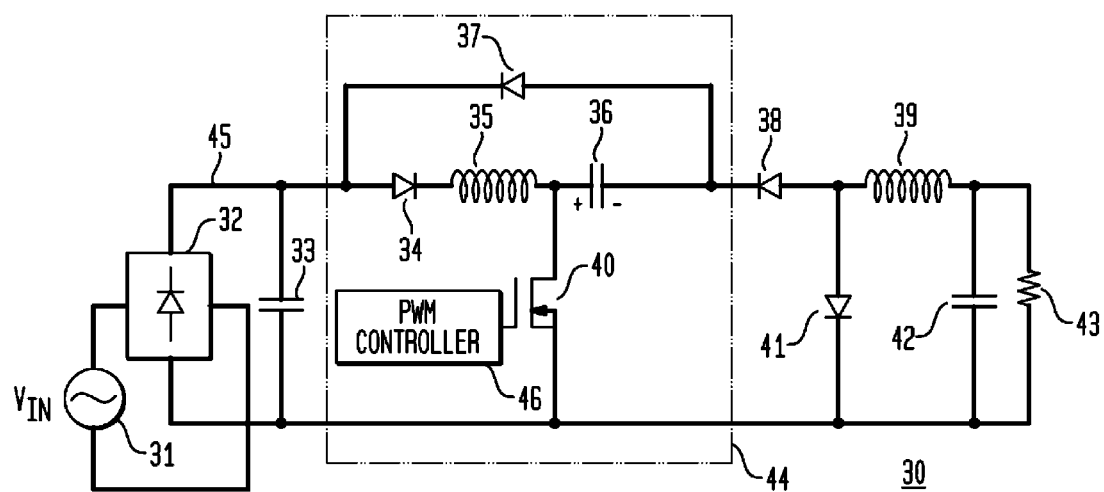
FIG. 2 is a circuit diagram illustrating a prior art cascaded converter.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 3:
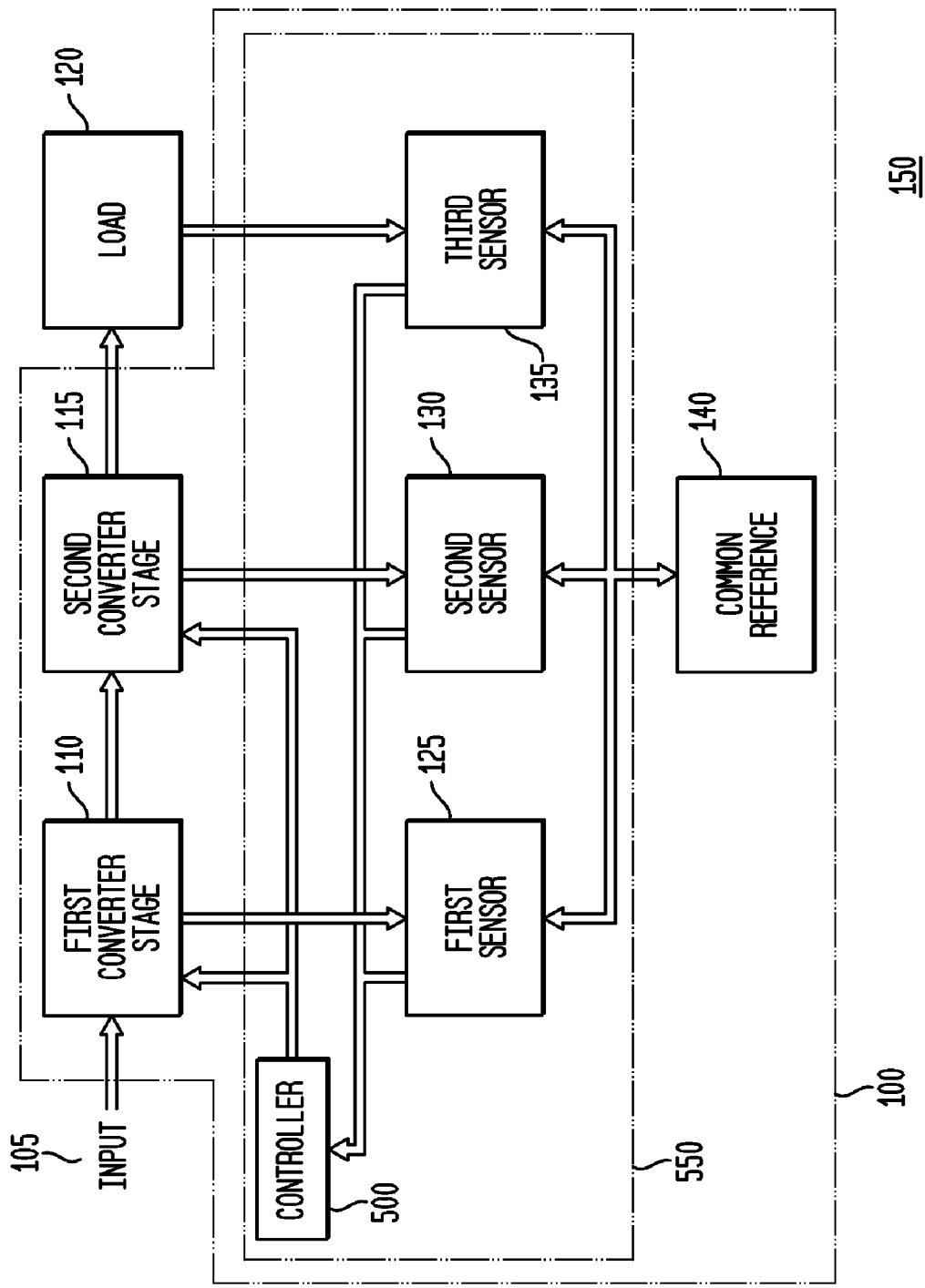
FIG. 3 is a block diagram illustrating a first exemplary system, a first exemplary regulator, and a first exemplary apparatus in accordance with the teachings of the present invention.

FIG. 3 is a block diagram illustrating a first exemplary system 150, first exemplary regulator 550, and a first exemplary apparatus 100 in accordance with the teachings of the present invention. The system 150 comprises the apparatus 100 and the load 120, and is couplable to receive input power, such as an AC or DC input voltage, such as input 105 which is couplable or connected to the first converter stage 110. The first exemplary apparatus 100 comprises a first converter stage 110, a second converter stage 115, a controller 500, and a plurality of sensors with a common reference 140, such as being referenced to a common node such as a ground potential, illustrated as a first sensor 125, a second sensor 130, and a third sensor 135. (Additional sensors may also be utilized, such as an optional fourth, fifth and sixth sensors discussed with reference to FIG. 4.) The regulator portion of the apparatus 100 (first exemplary regulator 550) comprises the controller 500 and the various sensors 125, 130, 135. The apparatus 100 receives an input 105, such as an AC or DC voltage, and using feedback provided by the plurality of sensors 125, 130, 135, the controller 500 generates one or more control signals to the first converter stage 110 and second converter stage 115, such as a control signal for turning a switch into an on and conducting state, or turning a switch into an off and substantially non-conducting state, to provide a controlled current to a load 120, such as one or more LEDs.

Figure 4:
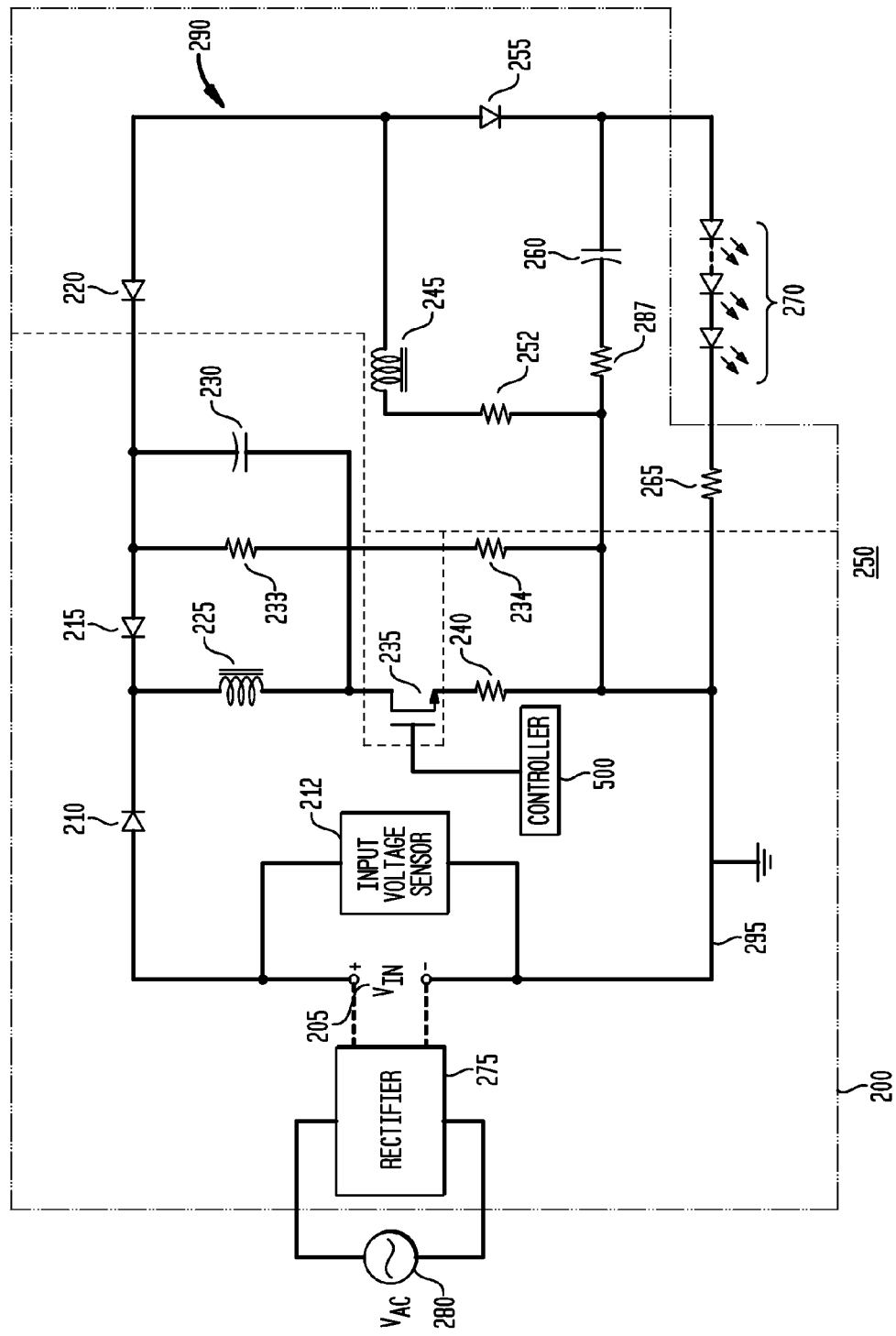
FIG. 4 is a block and circuit diagram illustrating a second exemplary system and a second exemplary apparatus in accordance with the teachings of the present invention.

FIG. 4 is a block and circuit diagram illustrating a second exemplary system 250 and a second exemplary apparatus 200 (such as an LED driver with a cascaded converter), in accordance with the teachings of the present invention. A regulator portion of the apparatus 200 is not separately illustrated, but may be considered to comprise the controller 500 and at least some of the various sensors discussed below. As illustrated, the first stage 285 and the second stage 290 are demarcated from one another by the dotted line, while the apparatus 200 is demarcated by the dot-dash line. The power switch 235 is common to and shared by both the first and second stages 285, 290. The system 250 comprises the apparatus 200 and the non-linear load, illustrated as LEDs 270, and is couplable to receive input power, such as an AC or DC input voltage, such as an input voltage $V_{IN}$ (or $V_{in}$) 205 which is couplable or connected to the first stage 285. $V_{IN}$ 205 may be a DC voltage or may be a rectified AC voltage, such as a voltage generated by rectifier 275 and the AC voltage $V_{AC}$ 280. When utilized with a DC input voltage, the rectifier 275 is typically not included in the apparatus 200 or system 250. The operation of the apparatus 200 will be explained generally with reference to a DC or an AC input voltage, followed by a more detailed analytic explanation using a DC input voltage (Equations 1-29), and an AC input voltage (Equations 30-71).

The first stage 285 is a buck-boost converter comprising first diode 210, first inductor 225, second diode 215, first capacitor 230, and switch 235 (embodied as a field effect transistor, illustrated as an n-channel MOSFET), with a first sensor embodied as first sense resistor 240, a fifth sensor embodied as fifth sense resistors 233 and 234, and with a sixth sensor 212, which is an input voltage sensor (and which may be embodied in a plurality of ways, such as another resistor, for example). The operation of the switch 235 is under the control of a controller 500, which may be embodied as any of the controllers 500A, 500B illustrated and discussed below with reference to FIGS. 8 and 10 (or other similar or equivalent controllers), and is typically coupled to the gate of the switch 235 via a buffer (not separately illustrated). In the first stage 285, first diode 210 functions as a blocking diode, to decouple the voltage across the first capacitor 230 from the input voltage $V_{IN}$ 205, allowing the first stage 285 (buck-boost) to operate independently of any ratio of $V_{IN}$ 205 the voltage across first capacitor 230. A first terminal of the first inductor 225 is coupled to the cathode of first diode 210 and a second terminal is coupled to the drain of the switch 235. The source of switch 235 is coupled via first sense resistor 240 to the common reference 295, which in this case is a ground potential as illustrated. The drain of the switch 235 is also coupled to the positive terminal of the first capacitor 230, and the negative terminal of first capacitor 230 is coupled to the first terminal of the first inductor 225 through the second diode 215. The first capacitor 230 may me be either polarized or non polarized. A voltage divider comprising resistors 233 and 234 is utilized, with resistor 234 operating as a fifth sense resistor for detection or sensing of the voltage across the capacitor 230. For the AC case for sensing the average voltage across the first capacitor 230, and additional third capacitor may also be used in parallel with resistor 234 to create an RC filter (not separately illustrated in FIG. 4), which is then used to provide feedback (discussed below) for the capacitor 230 voltage. A sixth sensor 212 is also be utilized to detect the input voltage $V_{IN}$. It should also be noted that switch 235 may be implemented as any type of power switch, in addition to the illustrated n-channel MOSFET, including without limitation a bipolar junction transistor, a p-channel MOSFET, various enhancement or depletion mode FETs, etc., and that a plurality of power switches may be utilized in the circuitry, provided that they are turned on and off substantially at that same time.

The second stage 290 is also embodied as a buck-boost converter, and is implemented to use the same switch 235 as the first stage 285. The second stage 290 further comprises a second inductor 245, a second capacitor 260, and third and fourth diodes 220 and 255, respectively, with a second sensor embodied as second sense resistor 252, and with a third sensor embodied as third sense resistor 265, which is coupled to a load comprising one or more LEDs 270. The second sense resistor 252 and third sense resistor 265 are also coupled to the common reference 295, illustrated as a ground potential. The first terminal of the second inductor 245 is coupled via second sense resistor 252 to the common reference 295 (ground terminal) and its second terminal is coupled to the anode of third diode 220. The cathode of third diode 220 is coupled to the negative terminal of first capacitor 230. The second terminal of the second inductor 245 is also coupled via fourth diode 255 to the positive terminal of the second capacitor 260. The negative terminal of the second capacitor 260 may be referenced and coupled directly to the common reference 295 (implemented as a ground terminal) or, alternatively, coupled to the common reference 295 via a fourth (current) sense resistor 287 as illustrated. The LEDs 270, as an exemplary load, is coupled to the common reference 295 via a third sensor, embodied as third sense resistor 265, which in turn are coupled in parallel with the second capacitor 260.

As illustrated, all sensors (first sense resistor 240, second sense resistor 252, third sense resistor 265, voltage divider having fifth sense resistor 234, sixth (input voltage) sensor 212, and optional fourth sense resistor 287) are all referenced to common reference 295, which in the exemplary embodiment, is a ground potential, typically coupled to or comprising a ground terminal. Accordingly, all major operational signals from the various sensors of the apparatus 200, which may be utilized to provided a corresponding plurality of feedback signals to the controller 500, are referenced to the same node, the common reference 295. It should be noted that while all of the various sensors may be utilized in some embodiments, for purposes of the present invention, the sensors which are utilized include the sixth (input voltage) sensor 212, the fifth sensor (resistor 234 of the voltage divider) for detecting the voltage across first capacitor 230, and the third sensor (third sense resistor 265), for detecting the load current (through LEDs 270). It should also be noted that the various sensors may be embodied in a wide number of ways, and all such embodiments are considered equivalent and within the scope of the present invention.

Figure 5A:
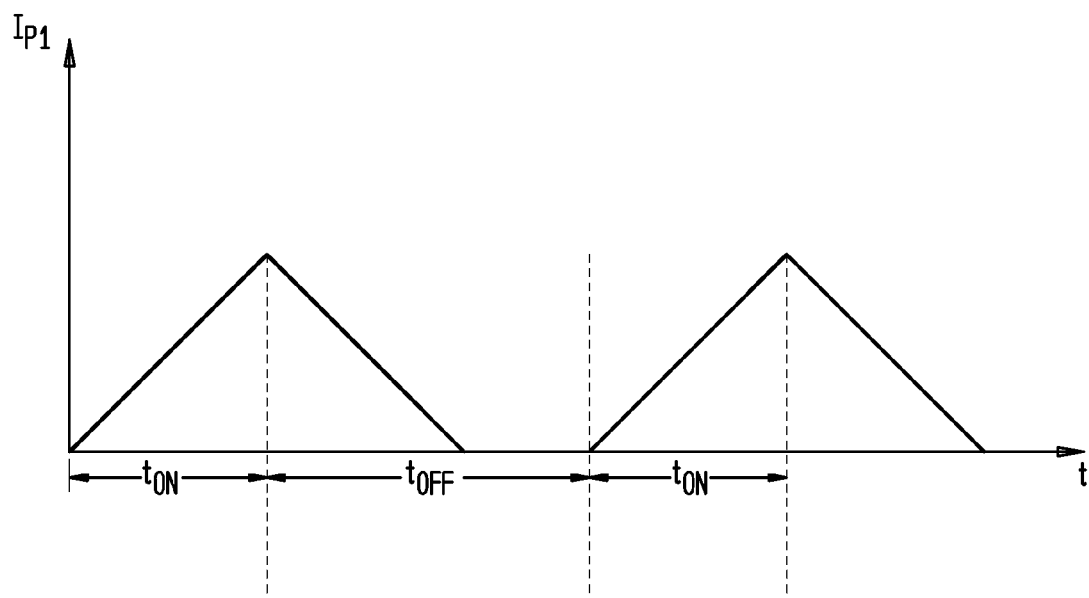
FIGS. 5A and 5B, is a graphical diagram illustrating exemplary first and second inductor current waveforms in accordance with the teachings of the present invention.
Figure 5B:
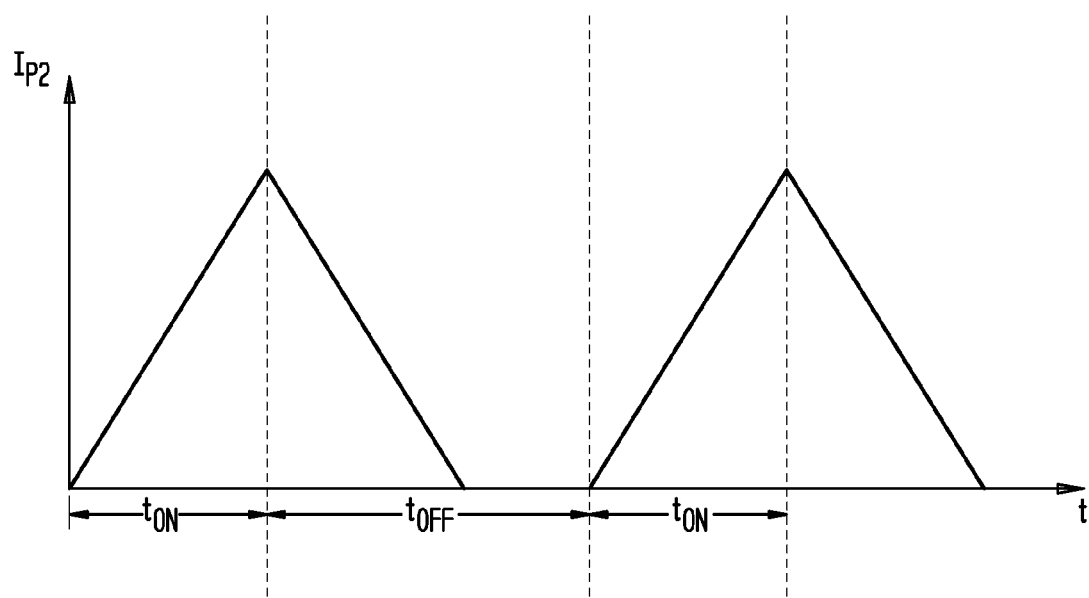

Continuing to refer to FIG. 4, when switch 235 is on and conducting (during a time interval referred to herein as "$t_{ON}$" or "$t_{on}$"), current flows via first diode 210, first inductor 225, switch 235, and first sense resistor 240, transferring energy from $V_{IN}$ 205 to the first inductor 225. During this same time interval $t_{ON}$, the first capacitor 230 is discharging through switch 235, first sense resistor 240, second sense resistor 252, second inductor 245, and third diode 220, thereby storing energy in the second inductor 245. Accordingly, during the same time interval ($t_{ON}$), the switch 235 is conducting currents of both the first stage 285 and second stage 290. When switch 235 is off and not conducting (during a time interval referred to herein as "$t_{OFF}$" or "$t_{off}$"), both the first and second inductors are discharging, with the first inductor 225 discharging into the first capacitor 230 and the second inductor 245 discharging into the load comprising LEDs 270 and into the second capacitor 260. An exemplary current ("$I_{P1}$") of first inductor 225 (in the first stage 285) and an exemplary current ("$I_{P2}$") of the second inductor 245 (in the second stage 290) are illustrated graphically in FIGS. 5A and 5B, respectively. Those of skill in the art will recognize that the currents depicted in FIGS. 5A and 5B are comparatively idealized representations, and that in practice, the currents may be different than the depictions.

The performance of the apparatus 100, 200 may be described analytically, with respect to a DC input voltage. The peak current of the second stage 290 is (Equation 1):

$$I_p = \frac{V_{c1} \cdot t_{on}}{L_2},$$

where $I_p$ is the peak current through the second inductor 245, $V_{c1}$ is the maximum DC voltage across the first capacitor 230 of the first stage 285, $t_{on}$ is the on-time of the switch 235, and $L_2$ is inductance of the second inductor 245.

The DC current of the second stage 290 for DCM is (Equation 2):

$$I_0 = \frac{I_p \cdot t_r}{2T},$$

where $t_r$ is the reset time of the second stage 290, and T is the cycle time of the switching of the switch 235 (typically a constant). The second inductor 245 $L_2$ voltseconds balance (for DCM) is (Equation 3): $V_{c1} \cdot t_{on} = V_o \cdot t_r$, where $V_o$ is the output voltage and the reset time is (Equation 4):

$$t_r = \frac{V_{c1} \cdot t_{on}}{V_o}.$$

From Equations 2 and 4, the DC current of the second stage 290 is (Equation 5):

$$I_o = \frac{I_p \cdot V_{c1} \cdot t_{on}}{2TV_o} = \frac{V_{c1}^2 \cdot t_{on}^2}{2L_2 \cdot T \cdot V_o}.$$

Assuming (Equation 6): $V_0 = I_0 \cdot R_o$, where $R_0$ is the equivalent resistance of the LEDs 270, then the DC current of the second stage 290 is (Equation 7):

$$I_0 = \frac{V_{c1} \cdot t_{on}}{\sqrt{2L_2 R_0 T}}.$$

The first stage (285) balance of voltseconds (for DCM) is (Equation 8): $V_{IN} \cdot t_{ON} = V_{c1} \cdot t_{OFF}$, where $V_{IN}$ is the input DC voltage, and $t_{OFF}$ is the reset time of the first stage 285.

From Equations 7 and 8, the DC current of the second stage 290 is (Equation 9):

$$I_0 = \frac{V_{in} \cdot t_{on}^2}{t_{off} \sqrt{2L_2 R_0 T}},$$

and the input power $P_{in}$ is (Equation 10):

$$P_{in} = L_1 \frac{I_{p1}^2}{2T} = \frac{V_{in}^2 \cdot t_{on}^2}{2L_1 T},$$

where $L_1$ is the inductance of the first inductor 225, IP1 is the peak current of the first stage; and the output power $P_0$ is (Equation 11):

$$P_0 = I_0^2 R_0 = \frac{V_{c1}^2 \cdot t_{on}^2}{2L_2 T}.$$

If it were assumed that there were no or negligible power losses, such that $P_{in} = P_0$ or $P_{in} \approx P_0$, then (Equation 12):

$$\frac{V_{in}^2}{L_1} = \frac{V_{c1}^2}{L_2},$$

or (Equation 13):

$$V_{c1} = V_{IN} \sqrt{\frac{L_2}{L_1}},$$

demonstrating that the DC voltage of the first stage 285 is proportional to the input DC Voltage $V_{IN}$, and providing the following feedback models as (Equation 14):

$$t_{ON} = \frac{I_0 \sqrt{2L_1 R_0 T}}{V_{IN}},$$

and (Equation 15):

$$\frac{t_{ON}}{t_{OFF}} = \sqrt{\frac{L_2}{L_1}} = \text{a constant value} = k.$$

In addition to such an analysis, a number of circuit design and performance considerations may also be suggested. For example, at a minimum input voltage ("$V_{in\ min}$") it can be concluded that both first (110, 285) and second (115, 290) converter stages can be set to operate in a critical conduction mode (in which a new switching cycle is started when the inductor current decreases substantially to a zero value). This performance optimization allows the apparatus 100, 200 to operate at minimum current levels, resulting in (Equations 16 and 17, respectively):

$$t_{on\ max} + t_r = T$$

$$t_{on\ max} + t_{off\ max} = T'$$

where $t_{on\ max}$ is the switch 235 on time at a minimum input voltage, and $t_{off\ max}$ is the reset time of the first stage (110, 285) at the minimum input voltage. With Equation 15 providing that $$\sqrt{\frac{L_2}{L_1}} = k,$$

and using Equations 13-15, then (Equations 18 and 19, respectively):

$$t_{on\ max} = \frac{T}{1 + \frac{kV_{in\ min}}{V_0}}$$

$$t_{on\ max} = \frac{T}{1 + \frac{1}{k}},$$

resulting in (Equation 20):

$$1 + \frac{1}{k} = 1 + \frac{kV_{in\ min}}{V_0},$$

or (Equation 21):

$$k = \sqrt{\frac{V_0}{V_{in\ min}}}.$$

As k is known from these equations (e.g., Equation 21), $V_{c1\ min}$ can be calculated from Equation 13 and $t_{on\ max}$ can be calculated from Equations 18 and 19, resulting in (Equation 22):

$$V_{c1\ min} = V_{in\ min} \sqrt{\frac{L_2}{L_1}},$$

and (Equation 23):

$$t_{on\,max} = \frac{T}{1+\frac{1}{k}}.$$

Using Equations 5, 7, and 1, the secondary stage inductance is then (Equation 24):

$$L_2 = \frac{V_{c1\,min}^2 \cdot t_{on\,max}^2}{2I_0^2 R_0 T},$$

the first stage inductance is (Equation 25):

$$L_1 = \frac{L_2}{k^2},$$

the second stage peak current is (Equation 26):

$$I_p = \frac{V_{c1\,min} \cdot t_{on\,max}}{L_2},$$

the first stage peak current is (Equation 27):

$$I_{p1} = \frac{V_{in\,min} \cdot t_{on\,max}}{L_1},$$

the minimum on time at the maximum input voltage $V_{in\,max}$ is then (Equation 28):

$$t_{on\,min} = t_{on\,max} \frac{V_{in\,min}}{V_{in\,max}},$$

and the maximum voltage of the first stage $V_{c1\,max}$ is (Equation 29): $V_{c1\,max} = kV_{in\,max}$.

Equations 1 through 29 represent an analytical or theoretical foundation for the exemplary inventive process of controlling the cascaded converter (apparatuses 100, 200) using a DC input voltage. When implemented functionally, using a constant switching frequency (constant cycle time (T) of the switching of switch 235), the on ($t_{ON}$) and off ($t_{OFF}$) times are simultaneously modulated to achieve a substantially balanced charging of the first and second storage capacitors 230, 260 of the cascaded converter. According to the exemplary embodiments of the invention, this results in sourcing a substantially constant current to the output load or, when applied to LEDs, driving a single LED, a plurality of LEDs, or an array or plurality of strings of LEDs.

The performance of the apparatus 100, 200 also may be described analytically, with respect to an AC input voltage. The average peak current of the second stage is (Equation 30):

$$\bar{I}_p = \frac{\bar{V}_{c1} \cdot t_{on}}{L_2},$$

where $\bar{I}_p$ is the average peak current, $\bar{V}_{c1}$ is the average DC Voltage of the first capacitor 230 of the first stage 285, $t_{on}$ is the on-time of the switch 235, and $L_2$ is the inductance of the second inductor 245 of the second stage 290.

The DC current of the second stage 290 is (Equation 31):

$$I_0 = \frac{\bar{I}_p \cdot t_r}{2T},$$

where $t_r$ is the reset time of the second stage 290, T is the cycle time of the switching of the switch 235 (typically a constant). The second inductor 245 $L_2$ voltseconds balance (for DCM) is (Equation 32): $\bar{V}_{c1} \cdot t_{on} = V_o \cdot t_r$, where $V_o$ is the output voltage and the reset time is (Equation 33):

$$t_r = \frac{\bar{V}_{c1} \cdot t_{on}}{V_o}.$$

From Equations 31 and 33, the DC current of the second stage 290 is (Equation 34):

$$I_o = \frac{\bar{I}_p \cdot \bar{V}_{c1} \cdot t_{on}}{2TV_o} = \frac{\bar{V}_{c1}^2 \cdot t_{on}^2}{2L_2 \cdot T \cdot V_o}.$$

Assuming $V_0 = I_0 \cdot R_o$ from Equation 6, where $R_0$ is the LED equivalent resistance, then the DC current of the second stage 290 is (Equation 35):

$$I_0 = \frac{\bar{V}_{c1} \cdot t_{on}}{\sqrt{2L_2 R_0 T}}.$$

With an input current "i", and (Equation 36):

$$L_1 \frac{di}{dt} = v_i,$$

where $v_i$ is the instantaneous input voltage, and (Equation 37):

$$di = \frac{v_i}{L_1} dt,$$

then (Equation 38):

$$i = \int di = \frac{t_{on}}{L_1} V_m \sin\omega t = I_m \sin\omega t,$$

where $V_m$ is the amplitude of the input voltage and $I_m$ is the amplitude of the average input current. Equation 38 is an analytical expression for a substantially sinusoidal primary current, provided that the on time is kept relatively or comparatively constant at least for the duration of the half cycle of the input AC Voltage. As discussed in greater detail below, it does not have harmonics higher than the first order harmonics.

The input current amplitude is (Equation 39):

$$I_m = \frac{t_{on}}{L_1} V_m.$$

For a DCM peak inductor current (Equations 40 and 41, respectively):

$$i_{p1+} = \frac{t_{on}}{L_1} v_i$$

$$i_{p1-} = \frac{\overline{V}_{c1}}{L_1} t_{offi}$$

With the typical boundary condition of $i_{p1+}=i_{p1-}$, then (Equation 42):

$$t_{offm} = t_{on} \frac{V_m}{\overline{V}_{c1}} \sin \omega t,$$

such that $t_{off}$ is modulated by $\sin \omega t$. The average value of $t_{off}$ is then (Equation 43):

$$\bar{t}_{off} = \frac{1}{\pi} \int_0^\pi t_{offi} d(\omega t) = \frac{2 t_{on} V_m}{\pi \overline{V}_{c1}},$$

and the balance of voltseconds for the first stage 285 is (Equation 44): $V_m t_{on} = \overline{V}_{c1} t_{offin}$.

Using Equations 35 and 44 provides (Equation 45):

$$I_0 = \frac{V_m t_{on}}{t_{offm} \sqrt{2 L_2 R_0 T}}.$$

The pulse energy in the first stage 285 is then (Equation 46):

$$w_i = L_1 \frac{i_{p1}^2}{2} = \frac{t_{on}^2 V_m^2}{2 L_1} \sin^2 \omega t,$$

the average energy in one half of the switching cycle is (Equation 47):

$$\bar{w} = \frac{1}{\pi} \int_0^\pi \frac{t_{on}^2 V_m^2}{2 L_1} \sin^2 \omega t\, d(\omega t) = \frac{t_{on}^2 V_m^2}{4 L 1},$$

the input power is (Equation 48):

$$P_{in} = \frac{t_{on}^2 V_m^2}{4 L_1 T},$$

and the output power $P_0$ is (Equation 49):

$$P_0 = I_0^2 R_0 = \frac{V_{c1}^2 t_{on}^2}{2 L_2 T}.$$

Again assuming no substantial power losses, such that $P_{in}=P_{out}$ or $P_{in} \approx P_0$, then (Equation 50):

$$\frac{V_m^2}{2 L_1} = \frac{\overline{V}_{c1}^2}{L_2},$$

or (Equation 51):

$$\overline{V}_{c1} = V_m \sqrt{\frac{L_2}{2 L_1}},$$

and providing the following feedback models (Equations 52 and 53, respectively):

$$t_{on} = \frac{2 I_0 \sqrt{L_1 R_0 T}}{V_m}$$

$$\frac{t_{on}}{t_{offm}} = \sqrt{\frac{L_2}{2 L_1}}.$$

Compared to the apparatus 100, 200 having a DC input voltage, the apparatus 100, 200 having an AC input voltage should have a different ratio of on time to off time of the switch 235, differing by a factor of $1/\sqrt{2}$, to maintain a substantially balanced charging of first and second storage capacitors 230, 260, respectively.

In addition to such an analysis for an AC input voltage, a number of circuit design and performance considerations may also be suggested. For example, at a minimum input voltage ("$V_{in\ min}$") it can be concluded that both first (110, 285) and second (115, 290) converter stages can be set to operate in the critical conduction mode (and for first stage 285, only when $v_i = V_{m\ min}$). This performance optimization then allows the apparatus 100, 200 to operate at minimum current levels, using Equations 16 and 17, discussed above. Then assigning a constant value to Equation 53, such that (Equation 54):

$$\sqrt{\frac{L_2}{2 L_1}} = k,$$

and using Equations 52 and 53, provides (Equations 55 and 56):

$$t_{on\max} = \frac{T}{1 + \frac{k V_{m\min}}{V_0}}$$

$$t_{on\max} = \frac{T}{1 + \frac{1}{k}}.$$

From Equations 55 and 56, it follows that (Equation 57):

$$1 + \frac{1}{k} = 1 + \frac{k V_{m\min}}{V_0},$$

or (Equation 58):

$$k = \sqrt{\frac{V_0}{V_{m\min}}}.$$

As k is known from these Equations (e.g., Equation 58), $V_{c1\ min}$ can be calculated from Equation 51 and $t_{on\ max}$ from Equations 55 or 56, providing (Equation 59):

$$\overline{V}_{c1\min} = V_{m\min}\sqrt{\frac{L_2}{2L_1}}$$

and (Equation 60):

$$t_{on\max} = \frac{T}{1 + \frac{1}{k}}.$$

Using Equations 35 and 30, the secondary stage inductance is (Equation 61):

$$L_2 = \frac{\overline{V}_{c1\min}^2 \cdot t_{on\max}^2}{2I_0^2 R_0 T},$$

the first stage inductance is (Equation 62):

$$L_1 = \frac{L_2}{2k^2},$$

the second stage peak current is (Equation 63):

$$I_p = \frac{\overline{V}_{c1\min} \cdot t_{on\max}}{L_2},$$

the first stage peak current is (Equation 64):

$$I_{p1} = \frac{V_{m\min} \cdot t_{on\max}}{L_1},$$

the minimum on time at maximum input voltage $V_{m\ max}$ is (Equation 65):

$$t_{on\min} = t_{on\max}\frac{V_{m\min}}{V_{m\max}},$$

the maximum voltage of the first stage $V_{c1\ max}$ is (Equation 66): $\overline{V}_{c1\ max} = kV_{m\ max}$.

The RMS value of the AC input current is (Equation 67):

$$I_{\text{rms}} = \sqrt{\frac{1}{\pi}\int_0^\pi \left(\frac{V_m t_{on}^2}{2L_1 T}\right)^2 \sin^2\omega t\, d(\omega t)} = \frac{V_m t_{on}^2}{2\sqrt{2}\,TL_1}.$$

Providing for power factor ("$P_f$") correction results in (Equation 68):

$$P_f = \frac{V_{\text{rms}} I_{\text{rms}}}{P_{in}} = \frac{V_m V_m t_{on}^2 \cdot 4L_1 T}{\sqrt{2}\cdot 2\sqrt{2}\,L_1 T \cdot V_m^2 t_{on}^2} = 1.$$

The total harmonic distortion ("THD") is (Equation 69):

$$THD = \sqrt{\frac{\cos^2\varphi}{P_f^2} - 1}.$$

Then using a technique of input current shaping, (Equation 70): $\cos \phi = 1$, results in (Equation 71): THD=0, namely, there are no higher order harmonics, as mentioned above.

Equations 30 through 71 then provide an analytical or theoretical foundation for the exemplary inventive process of controlling the cascaded converter (apparatuses 100, 200) using an AC input voltage with power factor correction. When implemented functionally, using a constant switching frequency (constant cycle time (T) of the switching of switch 235), the on ($t_{ON}$) and off ($t_{OFF}$) times are also simultaneously modulated to achieve a substantially balanced charging of the first and second storage capacitors 230, 260 of the cascaded converter. According to the exemplary embodiments of the invention, this results in sourcing a substantially constant current to the output load or, when applied to LEDs, driving a single LED, a plurality of LEDs, or an array or plurality of strings of LEDs.

Figure 6:
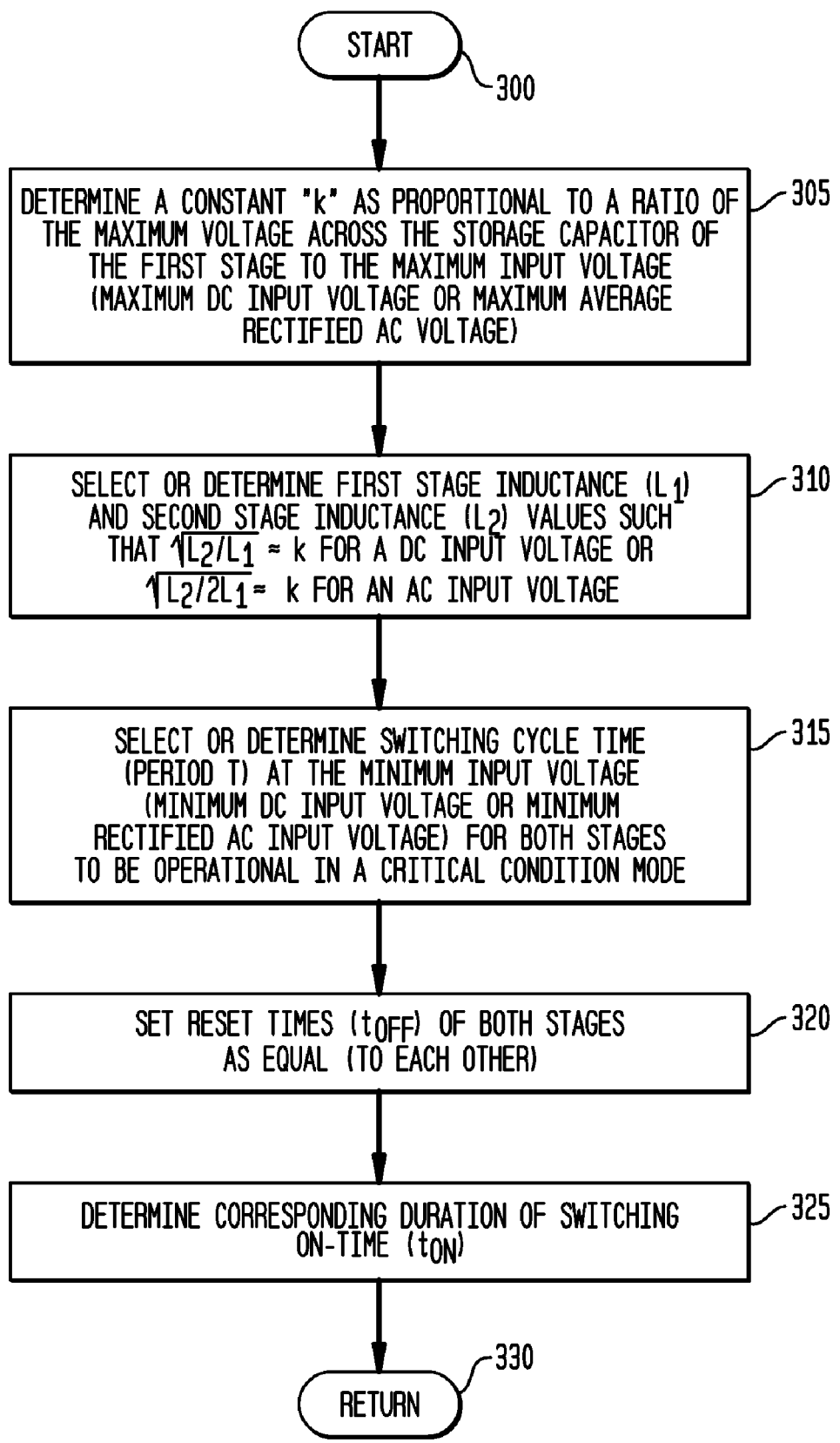
FIG. 6 is a flow diagram illustrating an exemplary pre-operational method in accordance with the teachings of the present invention.

FIG. 6 is a flow diagram illustrating an exemplary pre-operational method in accordance with the teachings of the present invention, which may be utilized in connection with the design or fabrication of an apparatus 100, 200. Beginning with start step 300, a constant "k" is determined as proportional to a ratio of the maximum voltage across the storage capacitor (230) of a first stage (110, 285) to the maximum input voltage, step 305. More particularly, for the DC case, the constant "k" is determined as substantially equal to a ratio of the maximum voltage across the storage capacitor (230) of a first stage (110, 285) to the maximum DC input voltage, and for the AC case, the constant "k" is determined as substantially equal to a ratio of the maximum voltage across the storage capacitor (230) of a first stage (110, 285) to the maximum average rectified AC input voltage. The inductance values $L_1$ and $L_2$ of the respective first and second inductors (225, 245) (of the respective first and second stages (110, 285; 115, 290)) are then selected, step 310, such that the square root of the ratio of the second inductance value ($L_2$) to the first inductance value ($L_1$) is proportional to the constant "k". More specifically, for the DC case, $$\sqrt{\frac{L_2}{L_1}} = k \ \left(\text{or } \sqrt{\frac{L_2}{L_1}} \approx k\right),$$

and for the AC case, $$\sqrt{\frac{L_2}{2L_1}} = k \left( \text{or } \sqrt{\frac{L_2}{2L_1}} \approx k \right).$$

As the last pre-operational steps, the switching cycle time (T) is selected or defined for the switch 235 (or similar switch for another circuit configuration) at the minimum DC input voltage or the minimum rectified AC input voltage for both stages to be capable of operating in the critical conduction mode, step 315; the reset times for both stages are set or determined as equal ($t_r$ (reset time of second stage 115, 290) is set substantially equal to $t_{OFF}$, the reset time of the first stage 110, 285), step 320; the corresponding on time ($t_{ON}$) is determined, step 325; and the pre-operational portion of the inventive method may end, return step 330. It should be noted that the various pre-operational steps of FIG. 6 may occur in a wide variety of orders, in addition to or in lieu of the order illustrated in FIG. 6.

Figure 7B:
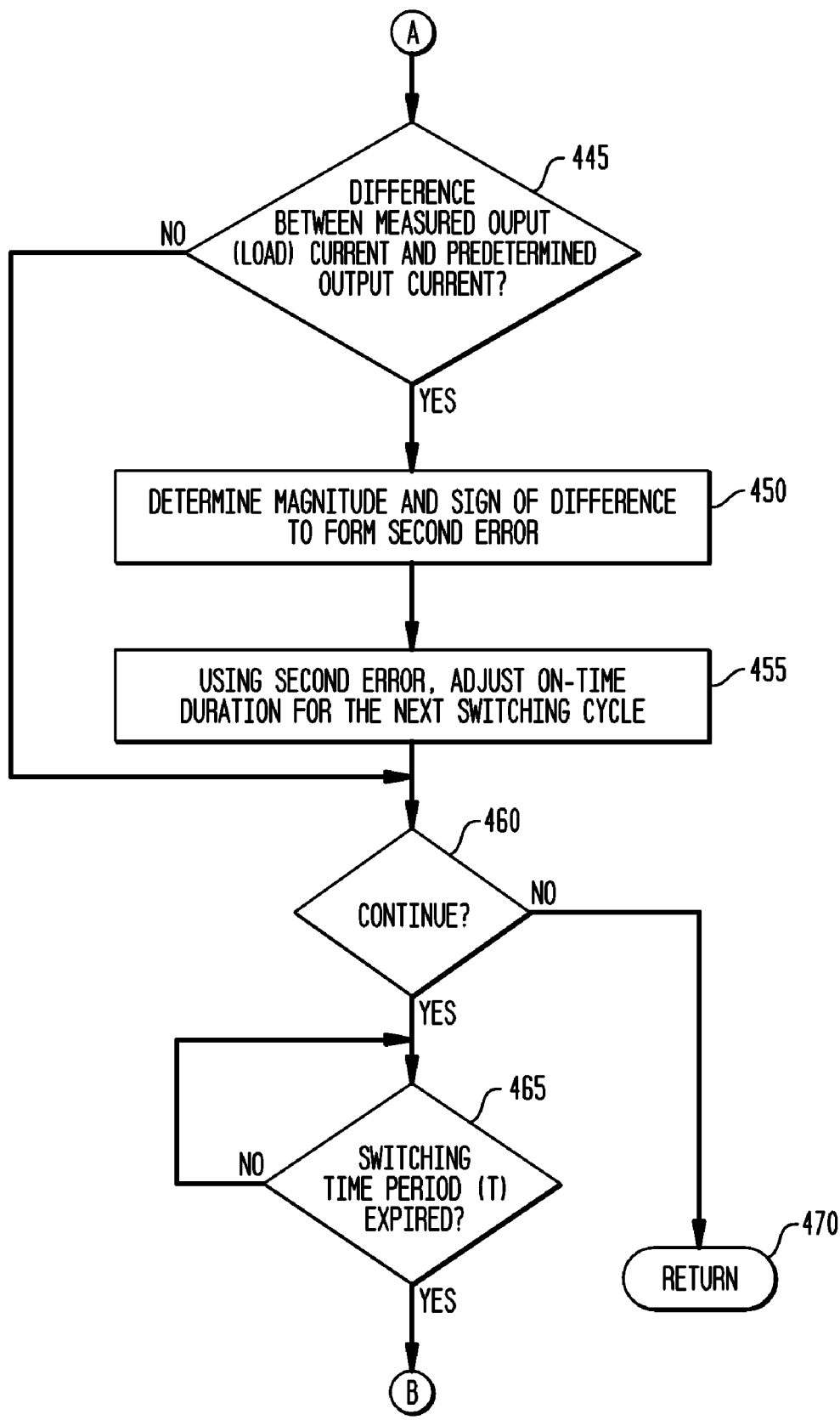
FIG. 7 is a flow diagram illustrating a first exemplary operational method in accordance with the teachings of the present invention.

FIG. 7 is a flow diagram illustrating an exemplary operational method in accordance with the teachings of the present invention. The inventive operational method provides for modulation of the switching cycle on time, maintaining the ratio of on time to reset time of the first stage, to deliver a substantially constant current to the output load. In addition, the inventive operational method provides for balancing the electrical charges of the storage capacitors of both stages of the cascaded converter, by maintaining substantially constant the ratio of the voltage across the first storage capacitor to the input voltage, which are set to be proportional to the square root of the ratio of the inductances of the second inductor to the first inductor, as described above, for either a DC or AC input voltage.

Figure 8:
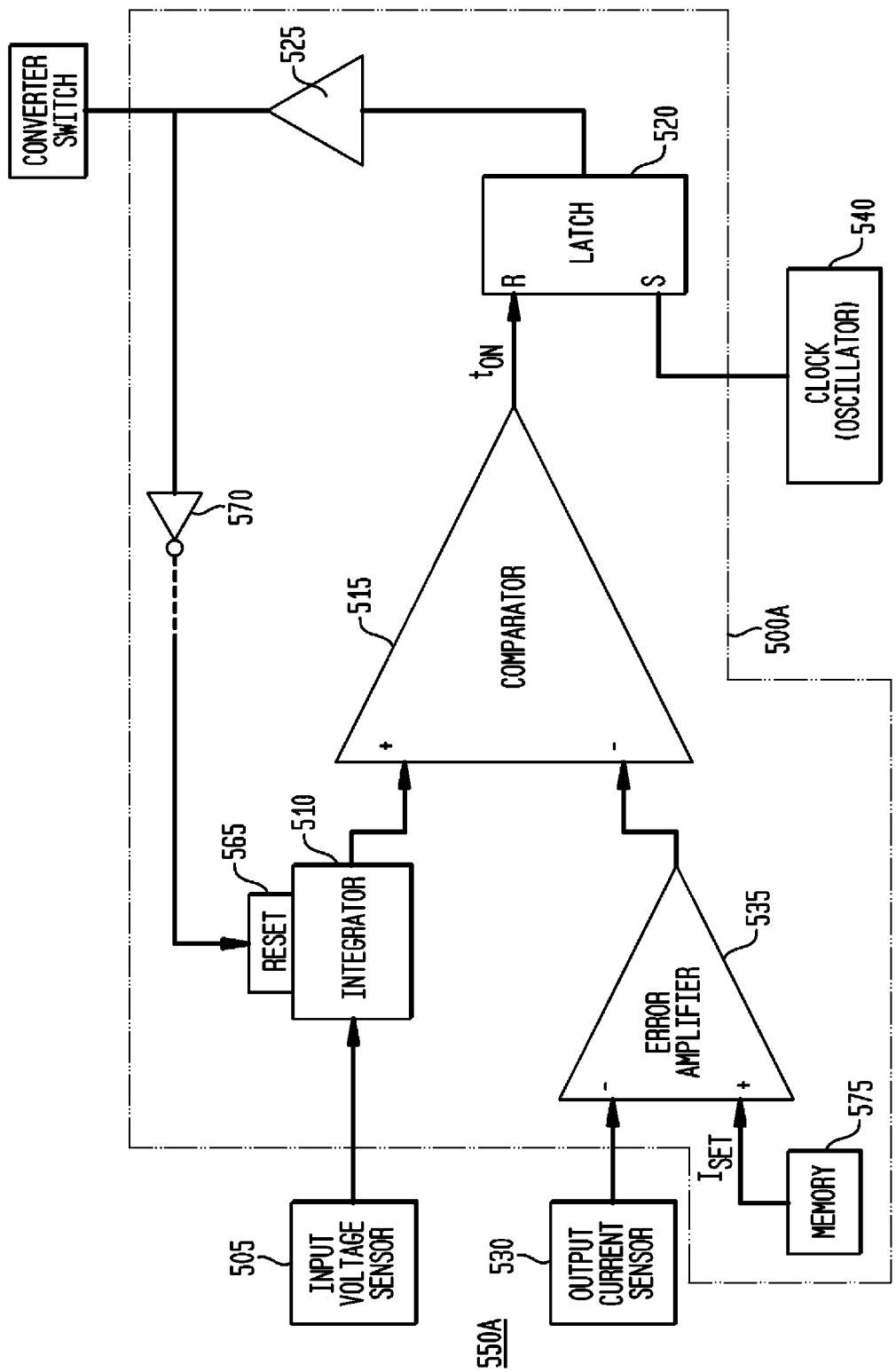
FIG. 8 is a block diagram illustrating a first exemplary controller and first exemplary regulator in accordance with the teachings of the present invention.

Referring to FIG. 7, the method begins, start step 400, by starting a current switching cycle, namely, under the control of the controller 500, the switch 235 is turned into an on and conducting state, for the duration of the determined on time ($t_{ON}$), step 405, after which the switch will be turned into an off and substantially non-conducting state. During this (current) switching cycle, the inventive operational method performs measurements and stores corresponding values, step 410. More particularly in step 410, for an exemplary embodiment, the method measures and stores values for (1) the input voltage, which may be either the DC input voltage or the average rectified AC input voltage (e.g., measured by input voltage sensor 212 (FIG. 4) or input voltage sensor 505 (FIG. 8); (2) the voltage across the first storage capacitor 230 (e.g., measured using sense resistors 233, 234), which may be the average voltage level value for the AC case; and (3) the current in the load (e.g., measured via third sense resistor 265), which may be the DC current (for the DC input voltage case) or which may be the average DC current (for the AC input voltage case). The method then determines the actual ratio of the voltage across the first storage capacitor to this input voltage (also for either the AC or DC case), step 415. The method compares this determined ratio with the set value of the square root of ratio of the second inductance to the first inductance (or to the square root of one-half of the ratio, for the AC case), step 420, and when there is a difference, step 425, determines a magnitude and sign of the error, as a first error, step 430. Using the first error, the inventive operational method calculates or otherwise determines a next on time value, to compensate for the first error, step 435. As discussed in greater detail below with reference to FIGS. 8 and 10, a comparatively fast feedback (or fast feedforward) loop will be utilized to execute this first compensation. For the AC case, the comparatively fast feedforward loop has a limited bandwidth compatible with power factor correction.

Having measured the DC current or average DC current in the load in step 410, the inventive operational method compares the measured load current with the predetermined or set value for this load current, step 440, and when there is a difference, step 445, determines a magnitude and sign of the error, as a second error, step 450. The method then adjusts the next on time value (previously determined in step 435), to compensate for the second error, step 455. Also as discussed in greater detail below with reference to FIGS. 8 and 10, a comparatively slow feedback loop will be utilized to execute this second compensation. Also for the AC case, the comparatively slow feedback loop has a limited bandwidth compatible with power factor correction.

In the next switching cycle, the next (or new) switching cycle on time is utilized by the controller 500, to control the switch 235 on time, in step 405. As discussed above, the overall cycle time (T) is maintained constant at the predetermined or set cycle time, with a next switching cycle beginning upon expiration of the cycle time period T. Accordingly, when operation is to be continued (i.e., until the apparatus 100, 200 is turned off), step 460, the method determines whether the switching period T (or, equivalently, switching off time $t_{OFF}$) has expired, step 465, and if so, the method returns to step 405 and continues to iterate. When operation is not to be continued in step 460, the method may end, return step 470.

As discussed in greater detail below, additional features may be included in the inventive operational method to provide hysteresis and to provide overshoot protection.

FIG. 8 is a block and circuit diagram illustrating a second exemplary current regulator 550A and a first exemplary controller 500A in accordance with the teachings of the present invention, which are exemplary instantiations, respectively, of a regulator 550 and a controller 500 discussed above. The controller 500A comprises an integrator 510 (with reset 565, to reset the integrator 510 to a zero value), a comparator 515, an error amplifier 535, a latch (or other form of memory) 520, and an optional buffer 525 (for driving switch 235). In exemplary embodiments, the controller 500A further comprises a memory 575, which may be any type of volatile or non-volatile memory, and is adapted to store the various parameters described above, such as values for k, T, the predetermined or set output (load) current ("$I_{SET}$"), etc. In alternative embodiments within the scope of the invention, the memory 575 may be embodied separately. Various components such as the integrator 510 may be configured in any of a plurality of ways. The second exemplary current regulator 550A comprises the controller 500A, input voltage sensor 505, and output current sensor 530. The input voltage sensor 505 may sense either the input DC voltage or the average rectified AC input voltage, and the output current sensor 530 may sense the output DC current or the average DC output current. For example, the input voltage sensor 505 may be coupled to the input voltage (as illustrated for input voltage sensor 212 in FIG. 4); and the output current sensor 530 may be embodied as a sense resistor (such as third sense resistor 265 illustrated in FIG. 4). Optionally, an oscillator or clock 540 may be included or derived from a system clock or other timing reference, and an inverter 570 may also be utilized, typically when the reset 565 of integrator 510 is implemented to reset upon a high signal).

The integrator 510, the error amplifier 535, and the comparator 515, may be embodied or implemented in a plurality of ways, including as operational amplifies as illustrated, or in any other analog or digital form of circuitry as known or becomes known in the electronic arts, and all such embodiments are considered equivalent.

As illustrated, the input of the integrator 510 is coupled to the input voltage sensor 505, and the output of the integrator 510 is coupled to a first input terminal of comparator 515 (the non-inverting terminal when the comparator 515 is embodied as an operational amplifier). The integrator 510 is adapted to provide the comparatively fast feedback (or feedforward) loop discussed above. A first input of the error amplifier 535 (the inverting terminal when the error amplifier 535 is embodied as an operational amplifier) is coupled to the output current sensor 530, a second input of the error amplifier 535 (the non-inverting terminal when the error amplifier 535 is embodied as an operational amplifier) is coupled to receive the predetermined (or set) value for the output (load) current ("$I_{SET}$") described above, and the output of the error amplifier 535 is coupled to a second terminal of comparator 515 (inverting terminal when the comparator 515 is embodied as an operational amplifier). The error amplifier 535 is adapted to provide the comparatively slow feedback (or feedforward) loop discussed above. The output of the comparator 515 is coupled to the R terminal of the latch 520, while a clock or oscillator 540 output is coupled to the S terminal of the latch 520. The output of the latch 520 is coupled to the (MOSFET) buffer 525, which drives the power switch 235 (illustrated in FIG. 4). The clock or oscillator 540 is adapted or programmed to provide an output signal corresponding to the switching cycle time T, described above, determined as part of the pre-operational method. The switching cycle time constant is maintained substantially constant by keeping substantially constant the number of clock cycles (of the clock or oscillator 540) corresponding to the switching cycle time (or period) T.

During the $t_{OFF}$ part of the switching cycle, the integrator 510 is in a reset status, and the output of the comparator 515 is correspondingly low. At the commencement of a next switching cycle, the clock or oscillator 540 sets the latch 520 (to have a set status), which via buffer 525, turns on the switch 235, and turns the reset (switch) 565 off (directly or via an inverter 570, as discussed above). The integrator 510 integrates a scaled version of the input voltage (via input voltage sensor 505), to a level determined by error amplifier 535. When this level is reached, the comparator 515 trips, with its output changing from a low state to a high state, resetting the latch 520, which in turn changes the state of the buffer 525, turning off the power switch 235 and changing the state of (e.g., turning on) the integrator reset (switch) 565. As described in greater detail below, the comparator 515 may be designed with a hysteresis to prevent bouncing of its output. For an AC embodiment, input voltage sensor 505 senses the average rectified input AC voltage, and the output current sensor 530 senses the average DC output current.

Figure 9:
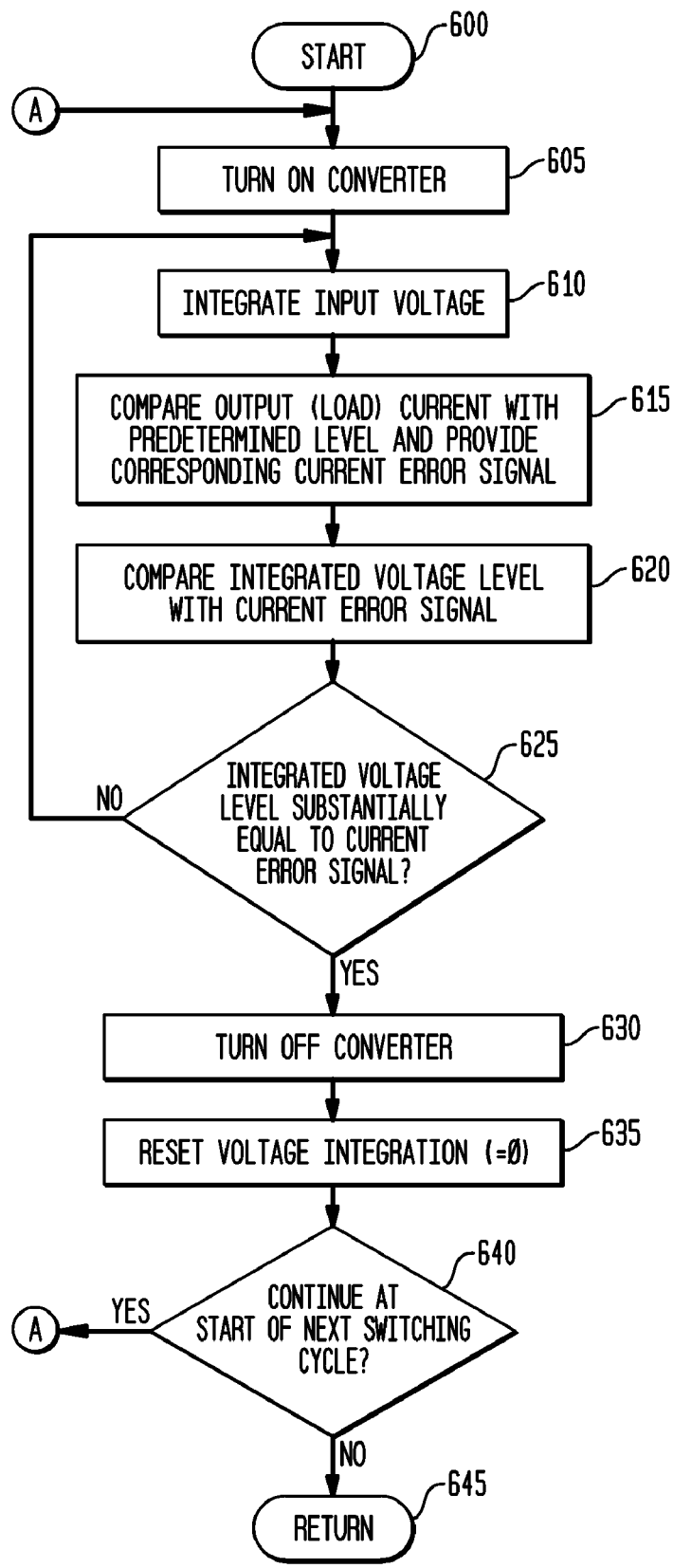
FIG. 9 is a flow diagram illustrating a second method of controlling a cascaded power converter in accordance with the teachings of the present invention.

FIG. 9 is a flow diagram illustrating a method of controlling a cascaded power converter in accordance with the teachings of the present invention. The method begins, start step 600, with turning on the power converter ($t_{ON}$), step 605, typically on the rising edge of a clock 540 signal (and typically via setting the latch 520 and turning on the buffer 525), and starting and continuing the integration (integrator 510) of the input voltage, step 610, which may be sensed through an input voltage sensor 212, 505. The input voltage may be a DC input voltage or an average rectified AC input voltage. The method compares (error amplifier 535) the output current (sensed via output current sensor 530) to a predetermined output current level, providing a corresponding current error signal, step 615. The method then compares the integrated voltage level to the current error signal (using comparator 515, which effectively references the integrator 510 to the output of the output current error amplifier 535), step 620, and when they are not substantially equal, step 625, the method returns to step 610 (as the voltage integration and current comparisons of steps 610 and 615 are continuous processes). When the integrated voltage level and the current error signal are substantially equal in step 625, the method turns off the power converter ($t_{OFF}$) (typically via resetting the latch 520 and turning off the buffer 525), step 630, and resets the voltage integration level (i.e., resets the integrator 510, typically via reset 565), step 635. When the method is to continue, at the start of the next switching cycle (T), step 640, the method returns to step 605 and iterates, and otherwise, the method may end, return step 645. As indicated above, the switching cycle time constant is maintained substantially constant by keeping substantially constant the number of clock cycles (of the clock or oscillator 540) corresponding to the switching cycle time (or period) T. The control method thereby modulates the on-time ($t_{ON}$) duration of the converter switching cycle, based upon at least two sensed or measured parameters, the input voltage level and the output current level. As illustrated in FIG. 8, various other components may be utilized to facilitate this process, such as latch 520, buffer 525, inverter 570, reset switch 565, etc.

Figure 10:
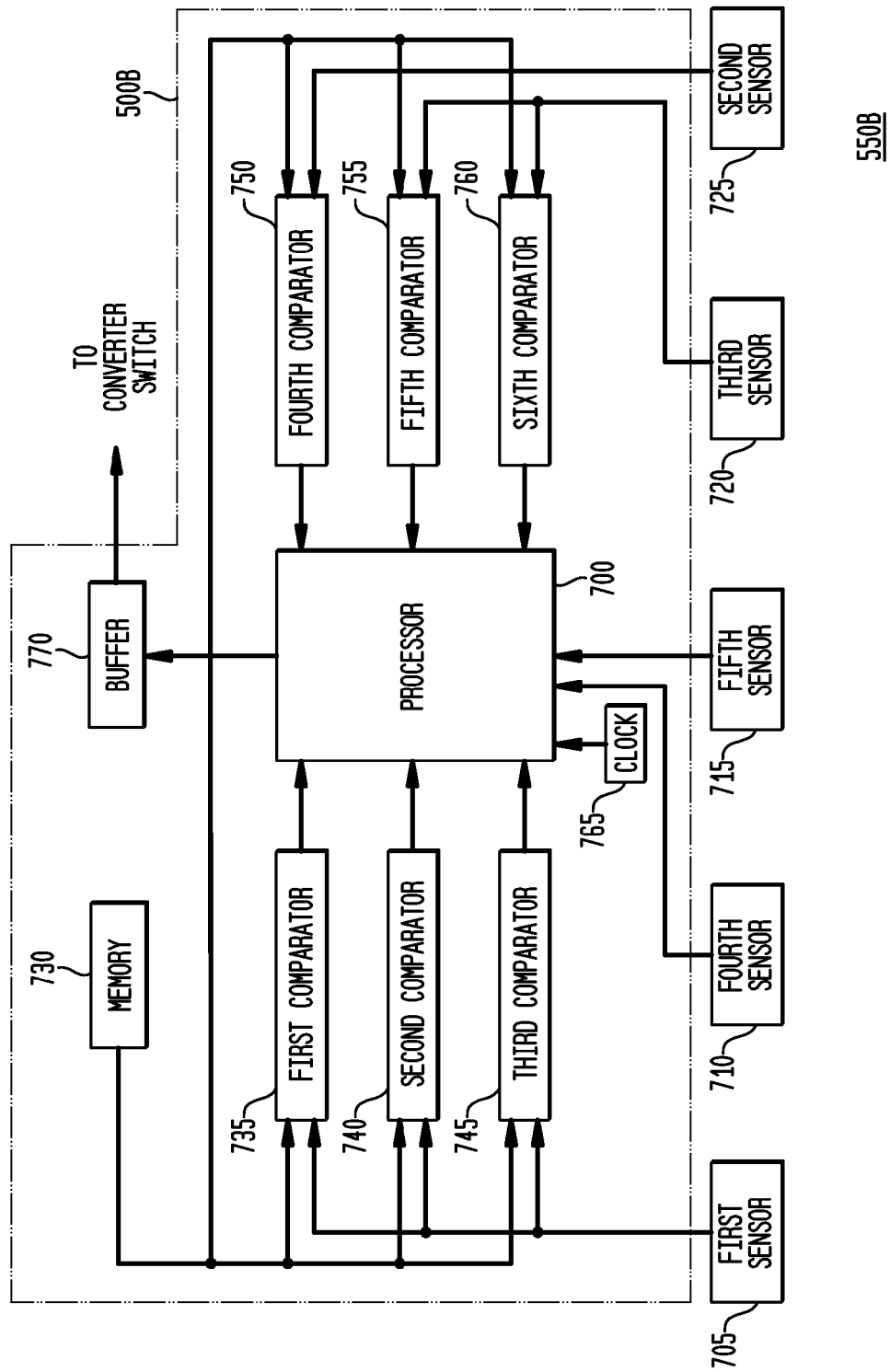
FIG. 10 is a block and circuit diagram illustrating a second exemplary controller and a second exemplary regulator in accordance with the teachings of the present invention.

FIG. 10 is a block and circuit diagram illustrating a second exemplary controller 500B and a third exemplary regulator 550B in accordance with the teachings of the present invention, which are also respective exemplary instantiations of a controller 500 and regulator 550 discussed above. The second exemplary controller 500B allows a predetermined amount of variation to occur in the load current, and hysteretically adjusts the on-time ($t_{ON}$) duration of the apparatus 100, 200 (cascaded converter) switching cycle. For this second exemplary controller 500B, the output (load) current $I_O$ is allowed to vary from the predetermined load current level $I_{SET}$ by a predetermined amount, $\Delta I$, such that $I_O \approx I_{SET} \pm \Delta I/2$. Described another way, the output (load) current $I_O$ is allowed to change between minimum $I_{O1}$ and maximum $I_{O2}$ values generally centered about $I_{SET}$. Prior to describing the controller 500B, the proposed method and apparatus are introduced analytically with a feedback model and drive technique to adjust on-time ($t_{ON}$) when the current is allowed to vary between $I_{O1}$ and $I_{O2}$.

The average DC output current may be described as (Equation 72):

$$I_0 = \frac{I_{p0} \cdot t_{r0}}{2T},$$

where $I_{p0}$ is the peak current of the second stage when the output DC current $I_O$ is equal to set current $I_{SET}$; $t_{r0}$ is the reset time for discontinuous current mode (DCM), and T is the switching cycle time. The peak current $I_{p0}$ may be described as (Equation 73):

$$I_{p0} = \frac{V_{c1} \cdot t_{on0}}{L_2},$$

where $t_{on0}$ is the on time when DC current $I_O$ is equal to set current $I_{SET}$. The reset time $t_{r0}$ may be described as (Equation 74):

$$t_{r0} = \frac{V_{c1} \cdot t_{on0}}{V_0}.$$

Then combining Equations 72-74, provides an expression for the DC output current $I_O$ (Equation 75):

$$I_0 = \frac{V_{c1}^2 \cdot t_{on0}^2}{2V_0 L_2 T}.$$

Figure 11:
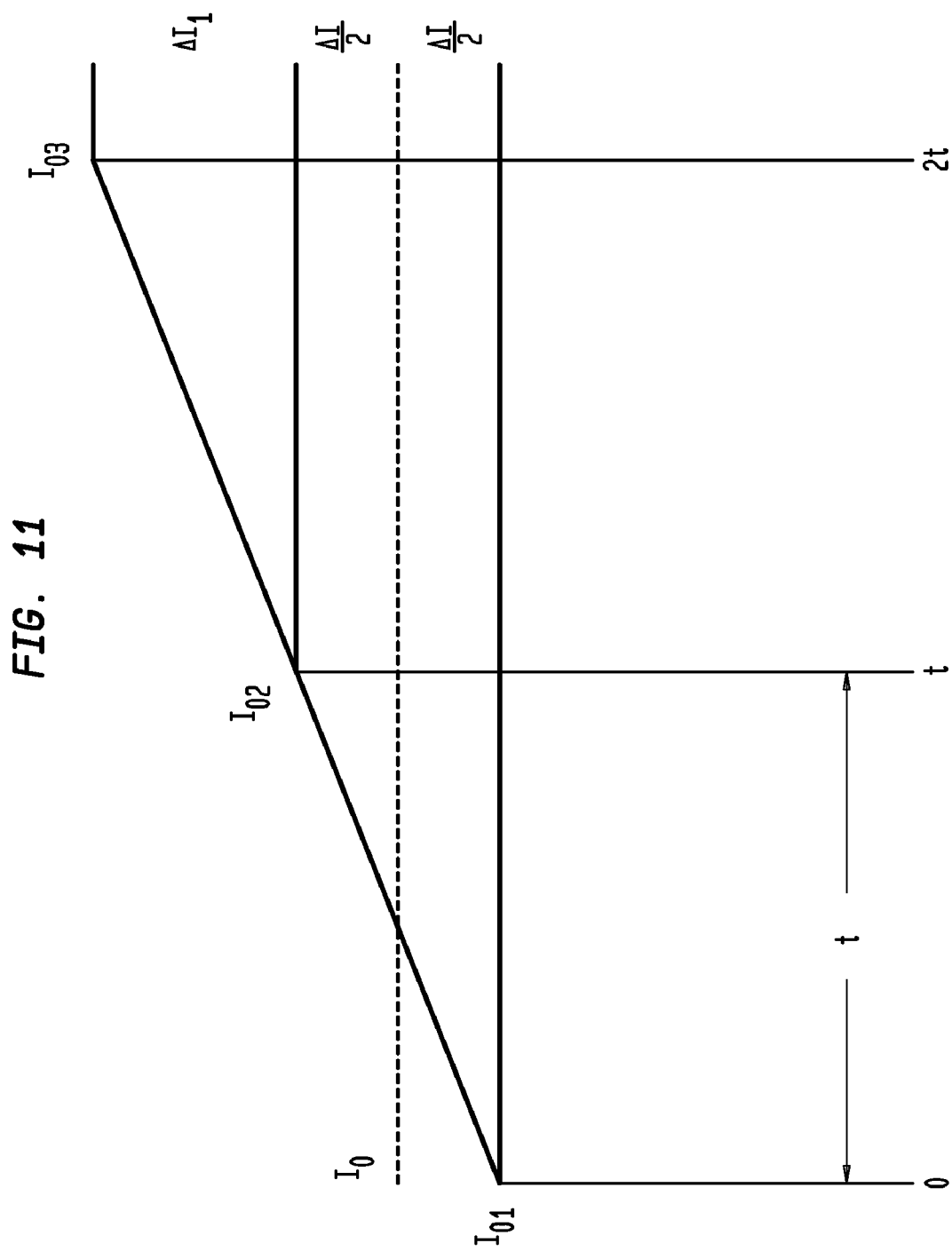
FIG. 11 is a graphical diagram illustrating changing output current levels in accordance with the teachings of the present invention.

FIG. 11 is a graphical diagram illustrating changing output current levels in accordance with the teachings of the present invention. When the apparatus 100, 200 is operated with a longer on time $t_{on1}$, where $t_{on1} > t_{on0}$, then over a period of time "t" the DC current will change (increase) from $I_{01}$ to $I_{02}$, assuming that the counting of time interval "t" begins when the DC current is equal to $I_{01}$. It also means that by using the longer on time $t_{on1}$, during the next period of time "t", the apparatus 100, 200 could deliver a steady DC Current $I_{03}$, where $I_{03} > I_{02}$, as follows (Equation 76):

$$I_{o3} = \frac{V_{c1}^2 \cdot t_{0n1}^2}{2V_0 L_2 T}.$$

In accordance with the invention, a new value of on time $t_{on0}$ will be derived and utilized for feedback, based on the existing on time $t_{on1}$, known parameters of the apparatus 100, 200 as described above, and the amount of elapsed time for the DC output current to have drifted from $I_{01}$ to $I_{02}$. Referring to FIG. 11, the current $I_{03}$ may be defined as a sum of $$I_0 + \Delta I_1 + \frac{\Delta I}{2}.$$

The latter portion, $$\Delta I_1 + \frac{\Delta I}{2},$$

is being used to charge the second storage capacitor 260 during run time "t", providing (Equation 77):

$$\Delta V_c = \left(\Delta I_1 + \frac{\Delta I}{2}\right)\frac{t}{C_2},$$

where $\Delta V_c$ is the voltage change across second capacitor 260 (FIG. 4) at the end of time t. It follows that (Equation 78):

$$\Delta I_1 + \frac{\Delta I}{2} = I_{o3} - I_0 = \frac{V_{c1}^2}{2V_0 L_2 T}(t_{on1}^2 - t_{on0}^2),$$

and (Equation 79):

$$\frac{C_2 \Delta V_c}{t} = \frac{V_{c1}^2}{2V_0 L_2 T}(t_{on1}^2 - t_{on0}^2).$$

From the VI characteristics of a string of LEDs, we have (Equation 80): $\Delta V_c = r\Delta I$, where r is the equivalent resistance of an LED diode. From a specification for the apparatus 100, 200, we may define an allowable variation in the output current level (Equation 81): $\Delta I = \alpha I_0$, where $\alpha$ denotes the width of the regulation envelope. If, for example, the accuracy of the apparatus 100, 200 is set to be +/−4%, then $\alpha=0.08$. Combining equations then provides (Equation 82):

$$\Delta V_c = \alpha r I_0 = \alpha k \frac{V_{c1}^2 \cdot t_{on0}^2}{2V_0 L_2 T},$$

and substituting this $\Delta V_c$ into Equation 79 provides (Equation 83):

$$\frac{C_2}{t}\alpha r \frac{V_{c1}^2 \cdot t_{on0}^2}{2V_0 L_2 T} = \frac{V_{c1}^2}{2V_0 L_2 T}(t_{on1}^2 - t_{on0}^2).$$

Solving Equation 83 provides (Equation 84):

$$t_{on0} = t_{on1}\frac{1}{\sqrt{1+\frac{\alpha r C_2}{t}}}.$$

Because the term $$\frac{\alpha r C_2}{t}$$

in the Equation 84 is quite small, $$\frac{\alpha r C_2}{t} \ll 1,$$

Equation 84 can be approximated as (Equation 85):

$$t_{on0} = t_{on1}\left(1 - \frac{\alpha r C_2}{2t}\right) = t_{on0} = t_{on1} - \Delta t_{on},$$

where (Equation 86):

$$\Delta t_{on} = \frac{\alpha r C_2}{2t}t_{on1}.$$

It should be noted that this approximation is only one of many linear approximations that can be used, and that other approximations, such as a Taylor series around other operating points, Lagrange series, etc., may also be used to obtain an equivalent formula for $\Delta t_{on}$.

Also, it may be more convenient to express the run time t in the number of switching cycles n (Equation 87):

$$\Delta t_{on} = \frac{\alpha r C_2}{2nT}t_{on1},$$

and to facilitate the operation of multiplication in digital logic, the on time increment may be measured using an inter val 2 orders of magnitude (100 times) greater, defining (Equation 88):

$$\beta = \frac{\alpha r C_2}{2T} 100,$$

such that (Equation 89):

$$\Delta t_{on100} = \frac{\beta}{n} t_{on1},$$

where $\Delta t_{on100} = 100 \Delta t_{on}$.

The sign of $\Delta t_{on100}$ should also be considered. From physical considerations, those having skill in the electronic arts will recognize that the sign of $\Delta t_{on100}$ will be negative if during the n cycles previously run, the DC current has increased from $I_{O1}$ to $I_{O2}$, and subsequently positive if the DC current has dropped from $I_{O2}$ to $I_{O1}$.

If we express $t_{on1}$ in system clock cycles, then for negative and positive $\Delta t_{on100}$, the formulas are (Equation 90):

$$\Delta t_{on100} = -\left(\text{Int}\left[\frac{\beta}{n} t_{on1}\right] + 1\right),$$

and (Equation 91):

$$\Delta t_{on100} = \left(\text{Int}\left[\frac{\beta}{n} t_{on1}\right] + 1\right),$$

with (Equation 92):

$$\Delta t_{on} = \frac{\Delta t_{on100}}{100}.$$

For example, when $\alpha=0.08$, $r=0.2$ ohm, $C=220$ μF, and $T=5$ μs, then $$\beta = \frac{\alpha r C}{T} 100 = \frac{0.08 \cdot 0.2 \cdot 220 \cdot 100}{5} = 70.$$

The parameter β may be viewed as a conglomerate parameter, which can be utilized to program the regulator or controller to keep the output current $I_O$ within the required accuracy α. After a few consecutive cycles of adjusting the switching on time $t_{ON}$, using Equations 90-92, the on time will converge into a steady state value, with a substantially large number of cycles n to change from one regulation level to another, leading to very small on time changes (which for practical considerations, can be a fixed number of clocks when n>100).

Figure 12A:
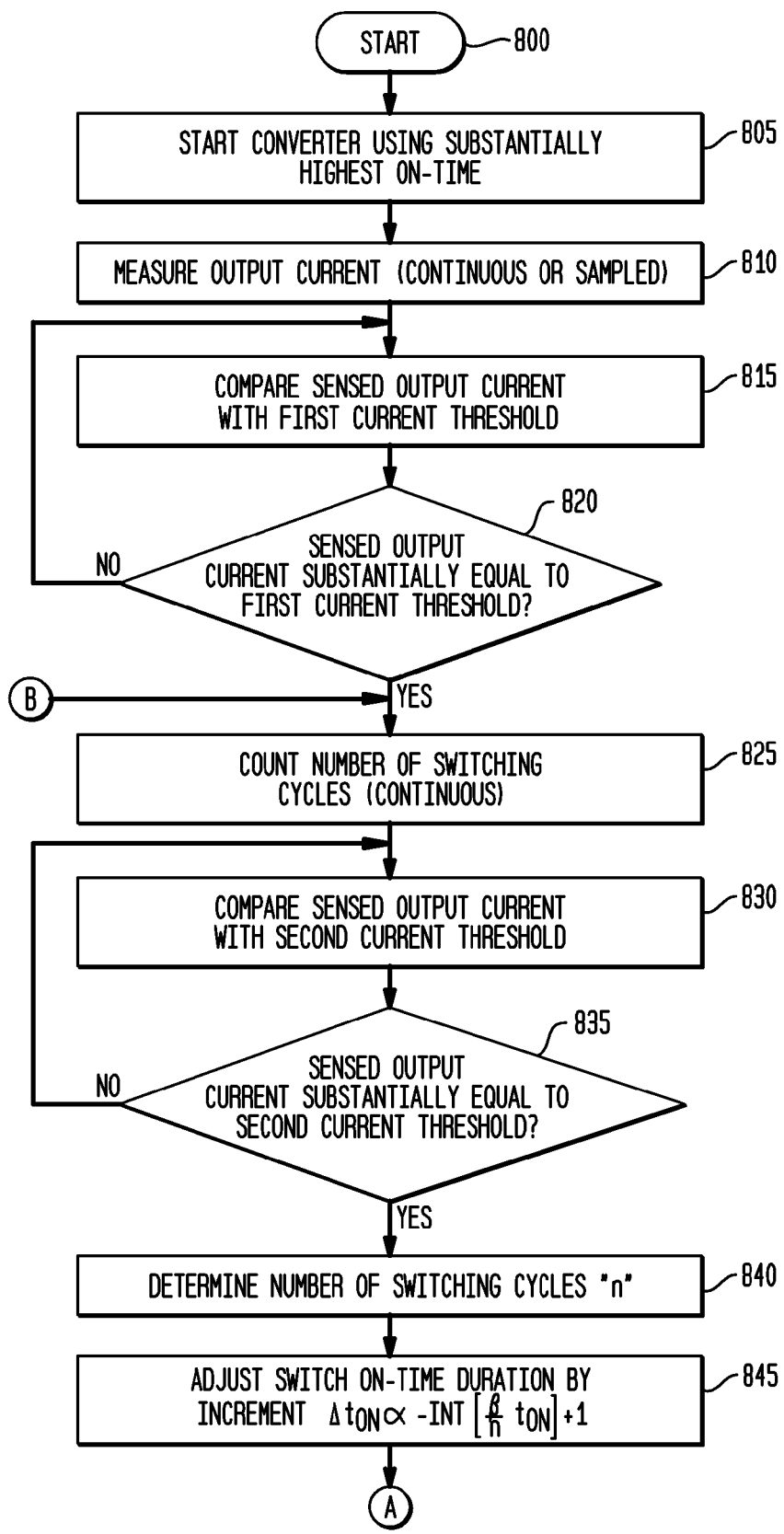
FIG. 12 is a flow diagram illustrating a third method of controlling a cascaded power converter in accordance with the teachings of the present invention.
Figure 12B:
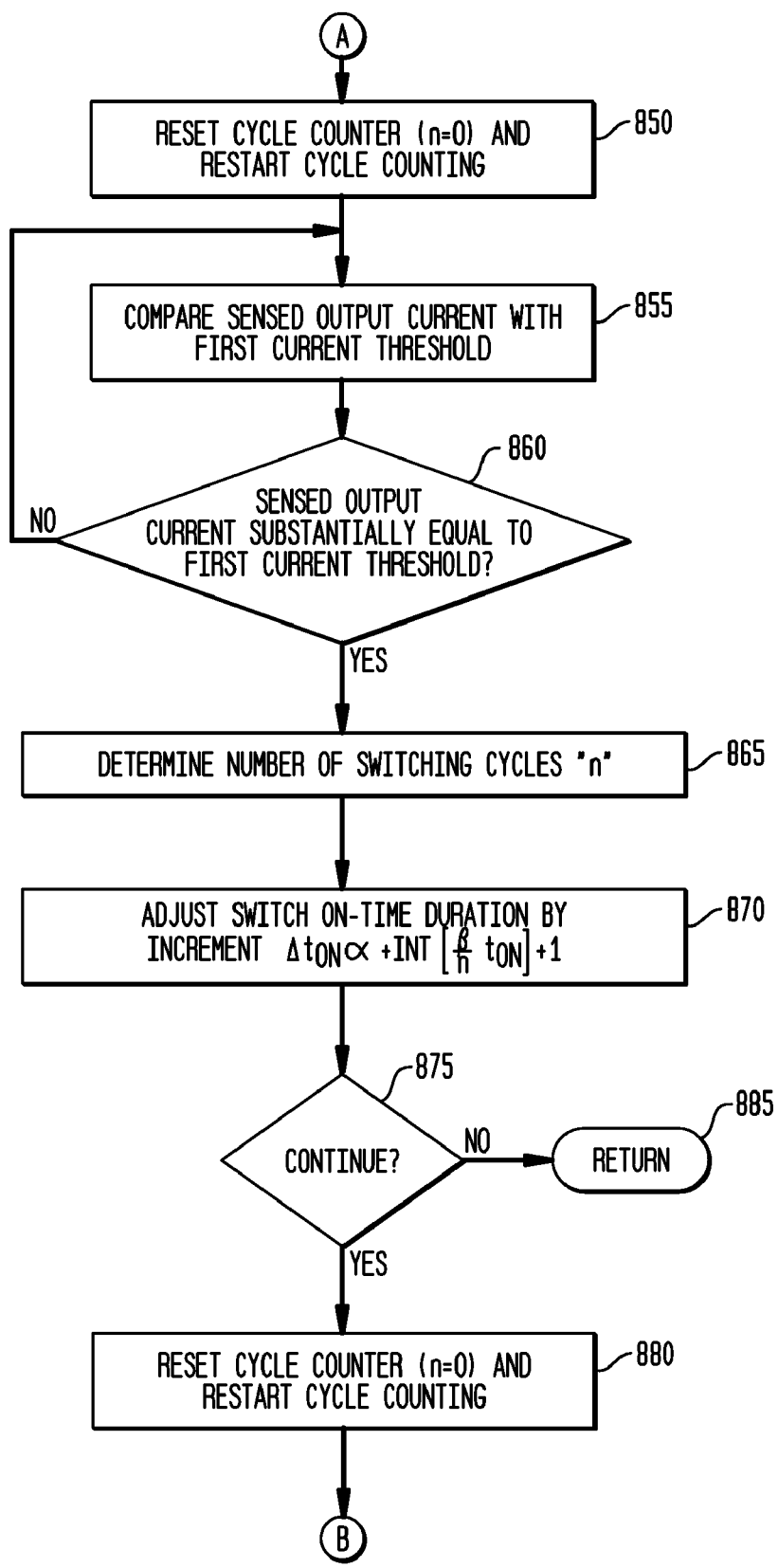

FIG. 12 is a flow diagram illustrating a third method of controlling a cascaded power converter in accordance with the teachings of the present invention. This third method of controlling the two stage DC or AC cascaded converter (apparatus 100, 200) involves a hysteretic process of regulating the output DC current by increasing or decreasing the on-time, by values inversely proportional to the run time "t", from one hysteretic level to another. Beginning with start step 800, the converter (apparatus 100, 200) is started with the (substantially) highest or maximum allowable or recommended on-time, step 805, and the output current (typically DC) is measured, step 810. Typically, the output current will be measured continuously or periodically (e.g., sampled), throughout this third method, for use in a plurality of comparison steps. The measured output current is compared with a first current threshold (or first control level), step 815, and when the measured output current has reached (increased to) the first current threshold (or first control level), step 820, the method starts counting the number of switching cycles, step 825, in an ongoing or continuous manner (until reset), and compares the measured output current with a second current threshold (or second control level), step 830.

When the measured output current has reached (increased to) the second current threshold (or second control level), step 835, the method determines the number "n" of switching cycles (for DC current to change from first to the second current threshold (or control) level), step 840, and adjusts (decrements) the switching on time by the increment $$\Delta t_{on} \propto -\text{Int}\left[\frac{\beta}{n} t_{on}\right] + 1,$$

or more particularly, $$\Delta t_{on} = -0.01\left(\text{Int}\left[\frac{\beta}{n} t_{on}\right] + 1\right),$$

step 845, where β is a converter numeric parameter, depending on its topology and regulation tolerances as described above, n is the number of switching cycles for DC current to change from first to the second current threshold (or control) level, and $t_{on}$ is the current on time. The method then resets the cycle counter, beginning another cycle count, step 850, and compares the measured output current with the first current threshold (or first control level), step 855. When the measured output current has reached (decreased to) the first current threshold (first control level), step 860, the method determines the number "n" of switching cycles (for DC current to change from second to the first current threshold (or control) level), step 865, and adjusts (increments) the switching on time by the increment $$\Delta t_{on} \propto +\text{Int}\left[\frac{\beta}{n} t_{on}\right] + 1,$$

or more particularly, $$\Delta t_{on} = +0.01\left(\text{Int}\left[\frac{\beta}{n} t_{on}\right] + 1\right),$$

step 870. When the method is to continue, step 875, the method then resets the cycle counter, beginning another cycle count, step 880, returns to step 825, and otherwise, the method may end, return step 885. It should be noted that using this hysteretic process of current regulation, the switching on time will tend to converge to a steady state value, within a fixed number of clocks adjustments, e.g., when number of cycles n is over 100 (or any other predetermined number).

It should be noted that by adjusting the on-time hysteretically as described above, the output current is confined to very slow changes, rarely hitting either the low or high thresholds.

During a start up of any converter, included a cascaded one (such as apparatus 100, 200), an additional amount of energy is used initially to charge the filter or storage capacitors, which typically leads to an overshoot of a regulated variable of the converter at the end of the start up period. In accordance with the exemplary embodiments, an inventive method is provided for digital control to complete such a start up (or initialization) process without an overshoot which, in this case, would be an overshoot of the output current. The average DC current of the second stage of apparatus 100, 200 is (Equation 93):

$$I_0 = \frac{I_{p0} \cdot t_r}{2T},$$

where $I_{p0}$ is the peak current, $t_r$ is the reset time (of the second inductor), T is the cycle time, and $I_0$ is the second stage DC output current (e.g., measured via resistor 252 of FIG. 4, rather than the load current (which also is considered an output current for other aspects of the invention)). At the start up of a converter (apparatus 100, 200), for faster start up, the peak output current $I_p$ is selected to be at a higher level $I_{ps}$ ($I_{ps} > I_p$) than it would be during steady-state operation, when $I_p = I_{p0}$ for a set DC output current. The increased current level $I_p$ is required to provide energy to charge the second capacitor 260. Immediately after the start up is finished, the controller 500 should reduce the on time to prevent an overshoot of the DC output current. A fourth method of the present invention uses a digital model to provide feedback to control the on time of the switching converter, to substantially prevent such an overshoot, and may be described analytically.

As indicated above, the DC output current $I_0$ should be equal to the set current level (Equation 94):

$$I_0 = \frac{I_{p0} \cdot t_{r0}}{2T_0}.$$

It is reasonable to assume that at the end of start up, the input voltage changes very slowly, so at the next cycle, such a change can be neglected. The value of DC current which could be produced by $I_p = I_{ps}$, if it is allowed to run without on time correction, may be expressed as (Equation 95):

$$I_s = \frac{I_{ps} \cdot t_s}{2T_s}.$$

The ratio of currents in equations 94 and 95 is (Equation 96):

$$\frac{I_0}{I_s} = \frac{I_{p0} \cdot t_{r0} \cdot T_s}{I_{ps} \cdot t_{rs} \cdot T_0}.$$

Using the expression of the peak current in an inductor as (Equation 97):

$$I_p = \frac{V_{c1} \cdot t_{on}}{L_2},$$

and substituting it into Equation 96 provides the following ratio (Equation 98):

$$\frac{I_0}{I_s} = \frac{t_{on0} \cdot t_{r0} \cdot T_s}{t_{on0} \cdot t_{rs} \cdot T_0}.$$

With an assumption of the slow changes of the first stage voltage $V_{c1}$, then the following are valid (Equation 99): $t_{r0} = pt_{on0}$ and (Equation 100): $t_{rs} = pt_{ons}$. These expressions may then be utilized to simplify Equation 98 to provide (Equation 101):

$$\frac{I_0}{I_s} = \frac{t_{on0}^2 \cdot T_s}{t_{on0}^2 \cdot T_0},$$

which may be solved to find the desired on time $t_{on0}$ (Equation 102):

$$t_{on0}^2 = t_{ons}^2 \frac{I_0 \cdot T_0}{I_s \cdot T_s}.$$

Then using Equation 96 (as the DC current $I_s$ is not known), provides (Equation 103):

$$t_{on0}^2 = t_{ons}^2 \frac{I_0 \cdot 2T_0}{I_{ps} \cdot t_{rs}},$$

or (Equation 104):

$$t_{on0} = t_{ons} \sqrt{\frac{2I_0 T_0}{I_{ps} t_{rs}}}.$$

Equation 104 provides a model for defining a next cycle on time immediately following the end of the start up, when a current sense comparator sends a signal, indicating that the predetermined level of the second stage DC output current $I_0$ (i.e., $I_{SET}$) has been reached.

Figure 13:
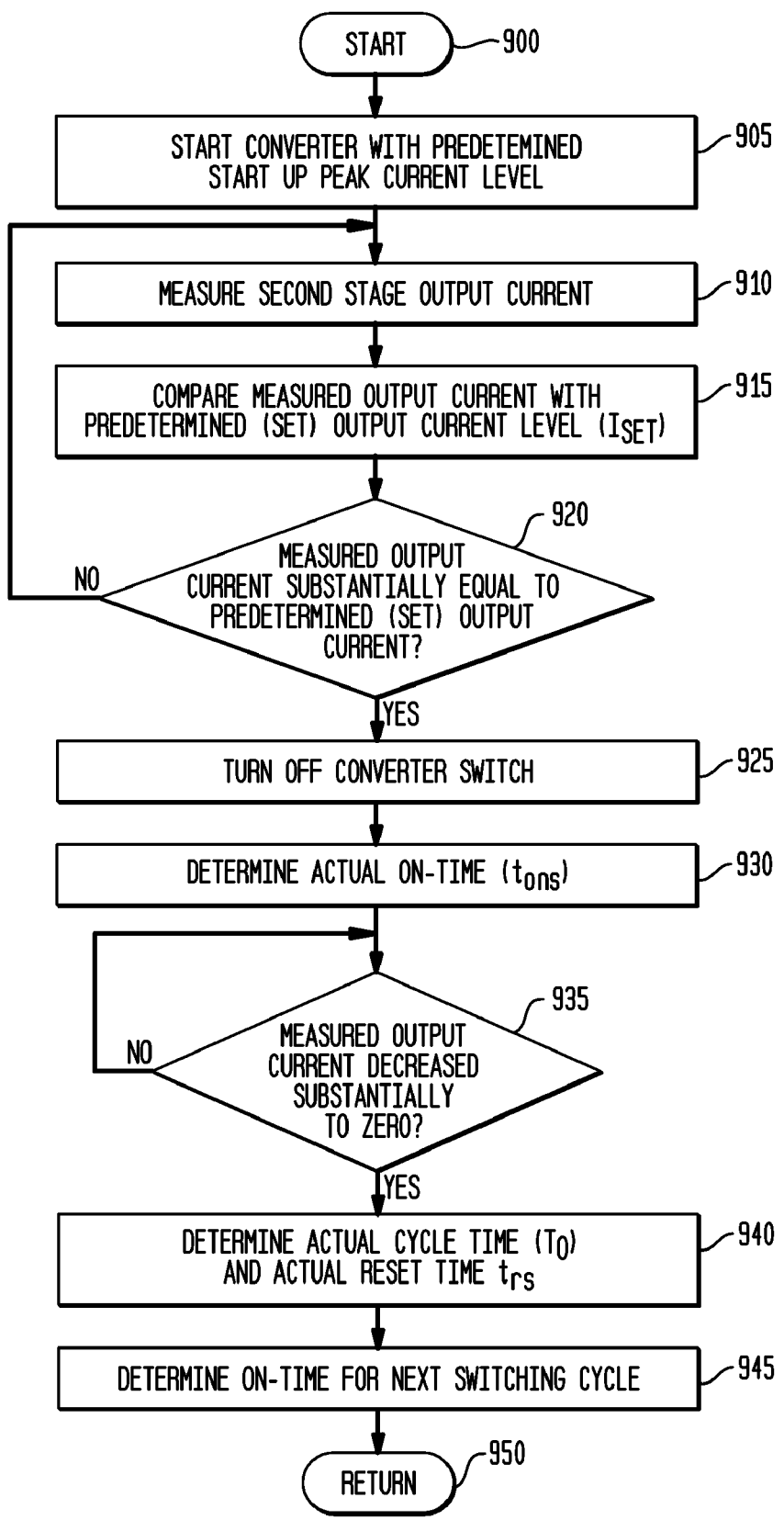
FIG. 13 is a flow diagram illustrating a fourth method of controlling a cascaded power converter in accordance with the teachings of the present invention.

FIG. 13 is a flow diagram illustrating a fourth method of controlling a cascaded power converter in accordance with the teachings of the present invention, for overshoot protection or control. As mentioned above, the inventive fourth method uses a digital model of the converter, in the constant current peak control mode, to determine a steady state on time. The method begins, start step 900, with starting the converter (apparatus 100, 200) with a preselected or predetermined start up peak current, step 905. The second stage output current is measured (e.g., using resistor 252 of FIG. 4), step 910, and the measured DC output current is compared with the predetermined steady-state (set) current ($I_{SET}$), step 915. When the measured output current has reached (increased to) the predetermined steady-state (set) current ($I_{SET}$), step 920, the converter switch (235) is turned off, step 925, and the method measures (determines) and stores the value for the actual switch on-time ($t_{ons}$), step 930. When the measured output current has decreased substantially to zero, step 935, the method determines the actual cycle time ($T_0$), and the actual reset time ($t_{rs}$) of the last switching cycle, step 940. The method then calculates or otherwise determines the next or steady-state switching on-time as $$t_{on0} \propto t_{on} \sqrt{\frac{2I_0 T_0}{I_{ps} t_{rs}}},$$

or more particularly, $$t_{on0} = t_{ons}\sqrt{\frac{2I_0T_0}{I_{ps}t_{rs}}},$$

step 945, where $I_O$ is the output current and is substantially equal to the set current ($I_{SET}$) and $I_{ps}$ is the peak current allowed at start up, and the method may end, return step 950.

It should be noted that this fourth methodology for start up is based on the modeled analysis, and the presented methodology for a buck boost converter is merely an example. Those having skill in the electronic arts may derive other specific digital models of a converter of other topologies, and use similar techniques to achieve a non-overshoot start up.

Referring again to FIG. 10, in light of the methods described above, the controller 500B may be utilized to implement the various fine levels of current control described above, including the hysteretic and overshoot controls. The controller 500B comprises a processor 700, a memory 730, a plurality of comparators (one or more of comparators 735, 740, 745, 750, 755, and 760), with the regulator 550B comprising the controller 500B and a plurality of sensors (one or more of sensors 705, 710, 715, 720, and 725). (Alternatively, the various sensors may also be considered to be part of a power converter as a whole (e.g., an apparatus 100, 200), rather than included as part of a regulator 550 or other portion of an apparatus 100, 200 which is designated as a regulator 550, such as with respect to the regulator 550A illustrated in FIG. 8, which does not include the sensors 505 and 530 as part of the control hardware.)

The processor 700 may comprise any type of digital or sequential logic for executing the methodologies and performing selected calculations as discussed above and as further described below. For example, the processor 700 may be implemented as a finite state machine, digital logic blocks, configurable logic blocks, or may be implemented to utilize an instruction set, and so on, as described in greater detail below. Continuing with the example, the processor 700 may be implemented utilizing various comparators, integrators, operational amplifiers, etc., previously discussed.

The memory 730 is utilized to store various parameters and reference values, such as $I_{SET}$; initial and subsequently determined values for the converter on-time ($t_{ON}$), converter reset times, converter switching period (T) duration (which may be in terms of time or cycles), peak current values for the output current, the first stage current, and the second stage current; first and second hysteresis levels for the output current, inductance values L1 and L2 (and/or corresponding derived calculations, such as $$\sqrt{\frac{L_2}{L_1}} \text{ or } \sqrt{\frac{L_2}{2L_1}}\bigg),$$

various maximum voltage levels, etc. Various parameters and reference values may be pre-calculated and stored in the memory, such as by carrying out the methodology described above with reference to FIG. 6. Other parameter and reference values may be received from the processor 700 and stored in memory, such as revised (next) values for $t_{ON}$, or the time increment values (e.g., $\Delta t_{ON}$), which may be calculated or otherwise determined by the processor 700 in real-time during operation of the apparatus 100, 200. Corresponding stored values are then provided to corresponding comparators, as illustrated. For example, a value for the set value of the output current ($I_{SET}$) is provided to first comparator 735, a first (low) hysteresis value for output current is provided to second comparator 740, a second (high) hysteresis value for output current is provided to third comparator 745, a predetermined second stage current level is provided to fourth comparator 750 (for use in overshoot protection during start up), and a maximum first stage current value is provided to sixth comparator 760 (for use in protection of the converter switch from potentially excessive current levels). The memory 730 may also provide various stored values directly to the processor 700, such as parameter values k, $t_{ON}$, reset times, T, etc.

First sensor 705 measures or determines converter output current ($I_O$) and, for example, may be embodied as a sense resistor, such as sense resistor 265. Second sensor 725 measures or determines converter second stage current and, for example, may be embodied as a sense resistor, such as sense resistor 252. Third sensor 720 measures or determines converter first stage current and, for example, may be embodied as a sense resistor, such as sense resistor 240. These three sensors 705, 725 and 720 are utilized to provide both the hysteretic and start up control discussed above. The fourth sensor 710 measures or determines converter input voltage $V_{IN}$ and, for example, may be embodied as a sense resistor, or more generally as input voltage sensor 212. The fifth sensor 715 measures or determines first stage capacitor (230) voltage and, for example, may be embodied as a sense resistor or voltage divider (e.g., resistors 233 and 234), or as an RC filter, or any number of other ways. The first, fourth and fifth sensors 705, 710 and 715 are utilized to provide the current control previously discussed with reference to FIGS. 7, 8 and 9.

First comparator 735 receives an output current value ($I_O$) from the first sensor 705 and compares it with a set value ($I_{SET}$) provided by the memory 730, with the resulting comparison utilized by the processor 700, such as the adjustment of the converter on-time. Second comparator 740 receives an output current value ($I_O$) from the first sensor 705 and compares it with a set value for the low threshold for hysteretic control ($I_{o1}$) provided by the memory 730, with the resulting comparison utilized by the processor 700, such as the adjustment of the converter on-time. Third comparator 745 receives an output current value ($I_O$) from the first sensor 705 and compares it with a set value for the high threshold for hysteretic control ($I_{o2}$) provided by the memory 730, with the resulting comparison utilized by the processor 700, also such as for the adjustment of the converter on-time. Fourth comparator 750 receives a second stage current value from the second sensor 725 and compares it with a set value for a second stage start up current for overshoot control (also provided by the memory 730), with the resulting comparison utilized by the processor 700, such as to turn off the converter switch 235 of the apparatus 100, 200 (typically via buffer 770) to prevent output current overshoot on start-up. Fifth comparator 755 receives a first stage current value from the third sensor 720 and compares it with a zero value (which also may be provided by the memory 730), thereby operating as a zero crossing detector, with the resulting comparison utilized by the processor 700, such as to turn on the converter switch 235 of the apparatus 100, 200 (also typically via buffer 770) to maintain the apparatus 100, 200 in critical conduction mode, rather than either or both continuous or discontinuous current modes. Sixth comparator 760 receives a first stage current value from the third sensor 720 and compares it with a set value (also provided by the memory 730), typically a maximum first stage current value, with the resulting comparison utilized by the processor 700, such as to turn off the converter switch 235 of the apparatus 100, 200 (typically via buffer 770) to provide protection to the switch 235 from potentially excessive current levels.

As indicated above, the controller 500 or a processor 700 may be any type of controller or processor, and may be embodied as any type of digital logic adapted to perform the functionality discussed herein. As the term controller or processor is used herein, a controller or processor may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller or processor should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with any associated memory, such as microprocessor memory or additional RAM, DRAM, SDRAM, SRAM, MRAM, ROM, FLASH, EPROM or E$_2$PROM. A controller or processor (such as controller 500, 500A, 500B, or processor 700), with its associated memory, may be adapted or configured (via programming, FPGA interconnection, or hard-wiring) to perform the methodology of the invention, as discussed above and below. For example, the methodology may be programmed and stored, in a controller 500 or processor 700 with its associated memory (and/or memory 730, 575) and other equivalent components, as a set of program instructions or other code (or equivalent configuration or other program) for subsequent execution when the controller or processor is operative (i.e., powered on and functioning). Equivalently, when the controller or processor may implemented in whole or part as FPGAs, custom ICs and/or ASICs, the FPGAs, custom ICs or ASICs also may be designed, configured and/or hard-wired to implement the methodology of the invention. For example, the controller or processor may be implemented as an arrangement of controllers, microprocessors, DSPs and/or ASICs, which are respectively programmed, designed, adapted or configured to implement the methodology of the invention, in conjunction with a memory 730.

The memory 730, 575, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a controller or processor IC), whether volatile or non-volatile, whether removable or non-removable, including without limitation RAM, FLASH, DRAM, SDRAM, SRAM, MRAM, FeRAM, ROM, EPROM or E$^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal. The memory 730, 575 may be adapted to store various look up tables, parameters, coefficients, other information and data, programs or instructions (of the software of the present invention), and other types of tables such as database tables.

As indicated above, the controller or processor may be programmed, using software and data structures of the invention, for example, to perform the methodology of the present invention. As a consequence, the system and method of the present invention may be embodied as software which provides such programming or other instructions, such as a set of instructions and/or metadata embodied within a computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the controller 125, 225, for example).

The software, metadata, or other source code of the present invention and any resulting bit file (object code, database, or look up table) may be embodied within any tangible storage medium, such as any of the computer or other machine-readable data storage media, as computer-readable instructions, data structures, program modules or other data, such as discussed above with respect to the memory 730 575, e.g., a floppy disk, a CDROM, a CD-RW, a DVD, a magnetic hard drive, an optical drive, or any other type of data storage apparatus or medium, as mentioned above.

Numerous advantages of the exemplary embodiments of the present invention, for providing power to non-linear loads such as LEDs, are readily apparent. The exemplary embodiments are capable of providing a plurality of types of control over such power delivery, such as providing a substantially constant current output, a hysteretic current output, and overshoot protection on start up. The exemplary embodiments utilize a plurality of sensors which are all referenced to a common reference node, such as ground, providing improved feedback signals and allowing for simpler and more robust control electronics, which further enables more accurate and fine-tuned control over power delivery and circuit protection, and enables an overall reduction in the size and cost of the converter. The exemplary embodiments provide significant power factor correction, i.e., a power factor which is close to unity, when connected to an AC line for input power, and further generates negligible harmonics or other forms of electromagnetic interference.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present invention, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. An apparatus for power conversion, the apparatus couplable to a nonlinear load, the apparatus comprising:
   a first power converter stage comprising a power switch and a first inductor, the first inductor having a first inductance;
   a first sensor coupled to the first power converter stage and coupled to a common reference node, the first sensor adapted to sense a first parameter of the first power converter stage;
   a second power converter stage coupled to the first power converter stage, the second power converter stage comprising a second inductor, the second inductor having a second inductance, the second power converter stage couplable to provide an output current to the nonlinear load;
   a second sensor coupled to the common reference node and couplable to the nonlinear load, the second sensor adapted to sense the output current level; and
   a controller coupled to the power switch, the first sensor and the second sensor, the controller adapted to turn the power switch into an on state for an on-time duration substantially proportional to a ratio of the second inductance to the first inductance.

2. The apparatus of claim 1, wherein the on-time duration is substantially proportional to either a square root of the ratio of the second inductance to the first inductance or to a square root of one-half of the ratio of the second inductance to the first inductance.

3. The apparatus of claim 1, wherein a ratio of the on-time duration to an off-time duration is substantially constant and substantially proportional to either a square root of the ratio of the second inductance to the first inductance or a square root of one-half of the ratio of the second inductance to the first inductance.

4. The apparatus of claim 1, wherein the first parameter is an input voltage level.

5. The apparatus of claim 4, wherein the first power converter stage further comprises a first capacitor, and wherein the apparatus further comprises a third sensor coupled to the first power converter stage and adapted to sense a first capacitor voltage level, and wherein the controller is further adapted to determine a first error substantially as a difference between the input voltage level and the first capacitor voltage level, and to use the first error to adjust the on-time duration of a next switching cycle.

6. The apparatus of claim 5, wherein the controller is further adapted to determine a second error substantially as a difference between the output current level and a predetermined output current level and to use the second error to adjust the on-time duration of the next switching cycle.

7. The apparatus of claim 6, wherein the first error is determined in a comparatively fast feedback loop of the controller and the second error is determined in a comparatively slow feedback loop of the controller.

8. The apparatus of claim 4, wherein the first power converter stage further comprises a first capacitor, wherein the apparatus further comprises a third sensor coupled to the first power converter stage and adapted to sense a first capacitor voltage level, and wherein the controller is further adapted to determine a voltage ratio of the input voltage level and the first capacitor voltage level, to determine a first error substantially as a difference between the voltage ratio and a predetermined ratio substantially proportional to the first and second inductance, and to use the first error to adjust the on-time duration of a next switching cycle.

9. The apparatus of claim 4, wherein the first power converter stage further comprises a first capacitor, wherein the apparatus further comprises a third sensor coupled to the first power converter stage and adapted to sense a first capacitor voltage level, and wherein the controller is further adapted to determine a voltage ratio of the input voltage level and the first capacitor voltage level, to determine a first error substantially as a difference between the voltage ratio and a predetermined ratio, and to use the first error to adjust the on-time duration of a next switching cycle, wherein the predetermined ratio is substantially proportional to either a square root of the ratio of the second inductance to the first inductance or a square root of one-half of the ratio of the second inductance to the first inductance.

10. The apparatus of claim 4, wherein the controller is further adapted to integrate the input voltage level, and when the integrated voltage level is substantially equal to a difference between the sensed output current level and a predetermined output current level, to turn the power switch into an off state for an off-time duration proportional to a difference between the switching cycle time and the on-time duration.

11. The apparatus of claim 1, wherein the controller is coupled to the power switch through a buffer circuit.

12. The apparatus of claim 1, wherein a switching cycle time is substantially constant and substantially proportional to a minimum input voltage substantially sufficient for both the first power converter stage and the second power converter stage to operate in a critical conduction mode.

13. The apparatus of claim 1, wherein the controller is further adapted to maintain the output current provided by the second power converter stage between a first threshold and a second threshold by incrementing or decrementing a next on-time duration by an amount $\Delta t_{on}$, wherein $\Delta t_{on}$ is substantially proportional to $$\text{Int}\left[\frac{\beta}{n}t_{on}\right]+1,$$

in which $\beta$ is a numeric parameter, n is a number of switching cycles for the output current to change between the first and second thresholds, and $t_{on}$ is the current on-time duration.

14. The apparatus of claim 1, wherein the apparatus further comprises a third sensor coupled to the second power converter stage and adapted to sense a second stage output current level, and wherein the controller is further adapted to turn the power switch into an off state when the sensed second stage output current level has reached substantially a predetermined peak current level, to determine an actual on-time duration of the current cycle, and when the sensed second stage output current level has decreased substantially to zero, to determine an actual switching time period and reset time period of the current switching cycle.

15. The apparatus of claim 14, wherein the controller is further adapted to determine the on-time duration $t_{on0}$ for a next switching cycle, wherein $t_{on0}$ is substantially proportional to $$t_{on}\sqrt{\frac{2I_O T_0}{I_{ps}t_{rs}}},$$

where $t_{on}$ is the on-time duration of the current switching cycle, $I_O$ is a predetermined output current level, $I_{ps}$ is the predetermined peak current level, $T_0$ is the actual switching time period of the current switching cycle, and $t_{rs}$ is the reset time period of the current switching cycle.

16. The apparatus of claim 1, wherein the first sensor is a first resistor and wherein the second sensor is a second resistor, and wherein the first and second resistors are coupled to the common reference node having a ground potential.

17. The apparatus of claim 16, wherein the first power converter stage further comprises:
a first diode couplable to an input voltage and coupled to the first inductor;
a first capacitor coupled to the power switch; and
wherein the power switch is coupled to the first inductor, the first capacitor, and the first resistor.

18. The apparatus of claim 17, wherein the second power converter stage is coupled to the power switch through the first resistor.

19. The apparatus of claim 18, wherein the second power converter stage further comprises:
a second diode coupled to the second inductor;
a second capacitor coupled to the second diode and couplable to the nonlinear load; and
wherein the second resistor is coupled to the first resistor at the common reference node.

20. The apparatus of claim 19, wherein the first power converter stage further comprises a third diode coupled between the first capacitor and the first inductor, and wherein the second power converter stage further comprises a fourth diode coupled between the second inductor and the first capacitor.

21. The apparatus of claim 17, further comprising a rectifier coupled to the first diode, coupled to the common reference node, and couplable to receive an AC input voltage.

22. The apparatus of claim 1, further comprising:
a fourth sensor coupled to the power switch and adapted to sense a first stage current level.

23. The apparatus of claim 1, wherein the first parameter is at least one of the following parameters: an input voltage level, a first capacitor voltage level, or a first stage current level.

24. The apparatus of claim 1, further comprising:
a fifth sensor coupled to the second inductor and adapted to sense a second stage current level.

25. The apparatus of claim 1, wherein the nonlinear load is a plurality of light emitting diodes.

26. The apparatus of claim 1, wherein the controller is adapted to vary the on-time duration comparatively slowly over a plurality of switching cycles to provide a power factor substantially close to one.

27. A method of providing power conversion for a nonlinear load using a power converter comprising a power switch and a first power converter stage coupled to a second power converter stage, the first power converter stage comprising a first inductor having a first inductance and the second power converter stage comprising a second inductor having a second inductance, the method comprising:
sensing a first parameter of the first power converter stage with reference to a common potential;
turning on the power switch for an on-time duration of a switching cycle and providing an output current to the nonlinear load, the on-time duration substantially proportional to a ratio of the second inductance to the first inductance; and
sensing the output current level with reference to the common potential.

28. The method of claim 27, wherein the on-time duration is substantially proportional to either a square root of the ratio of the second inductance to the first inductance or to a square root of one-half of the ratio of the second inductance to the first inductance.

29. The method of claim 27, wherein a ratio of the on-time duration to an off-time duration is substantially constant and substantially proportional to either a square root of the ratio of the second inductance to the first inductance or a square root of one-half of the ratio of the second inductance to the first inductance.

30. The method of claim 27, wherein the first parameter is an input voltage level.

31. The method of claim 30, further comprising:
sensing a first capacitor voltage level of the first power converter stage;
determining a first error substantially as a difference between the input voltage level and the first capacitor voltage level; and
using the first error, adjusting the on-time duration of a next switching cycle.

32. The method of claim 31, further comprising:
determining a second error substantially as a difference between the output current level and a predetermined output current level; and
using the second error, adjusting the on-time duration of the next switching cycle.

33. The method of claim 30, further comprising:
sensing a first capacitor voltage level of the first power converter stage;
determining a voltage ratio of the input voltage level and the first capacitor voltage level;
determining a first error substantially as a difference between the voltage ratio and a predetermined ratio proportional to the first and second inductance; and
using the first error, adjusting the on-time duration of a next switching cycle.

34. The method of claim 30, further comprising:
sensing a first capacitor voltage level of the first power converter stage;
determining a voltage ratio of the input voltage level and the first capacitor voltage level;
determining a first error substantially as a difference between the voltage ratio and a predetermined ratio, the predetermined ratio proportional to either a square root of the ratio of the second inductance to the first inductance or a square root of one-half of the ratio of the second inductance to the first inductance; and
using the first error, adjusting the on-time duration of a next switching cycle.

35. The method of claim 30, further comprising:
integrating the input voltage level; and
when the integrated voltage level is substantially equal to a difference between the sensed output current level and a predetermined output current level, turning the power switch into an off state for an off-time duration substantially proportional to a difference between a switching cycle time and the on-time duration.

36. The method of claim 27, further comprising:
maintaining a switching cycle time substantially constant and substantially proportional to a minimum input voltage, wherein the minimum input voltage is substantially sufficient for both the first power converter stage and the second power converter stage to operate in a critical conduction mode.

37. The method of claim 27, further comprising:
maintaining the output current provided by the second power converter stage between a first threshold and a second threshold by incrementing or decrementing a next on-time duration by an amount $\Delta t_{on}$, wherein $\Delta t_{on}$ is substantially proportional to $$\text{Int}\left[\frac{\beta}{n}t_{on}\right]+1,$$

in which $\beta$ is a numeric parameter, n is a number of switching cycles for the output current to change between the first and second thresholds, and $t_{on}$ is the current on-time duration.

38. The method of claim 27, further comprising:
sensing a second stage output current;
turning the power switch into an off state when the sensed second stage output current level has reached substantially a predetermined peak current level;
determining an actual on-time duration of a current switching cycle; and
when the sensed second stage output current level has decreased substantially to zero, determining an actual switching time period and reset time period of the current switching cycle.

39. The method of claim 38, further comprising:
determining the on-time duration $t_{on0}$ for a next switching cycle as substantially proportional to $$t_{on}\sqrt{\frac{2I_O T_0}{I_{ps}t_{rs}}},$$

where $t_{on}$ is the on-time duration of the current switching cycle, $I_O$ is a predetermined output current level, $I_{ps}$ is the predetermined peak current level, $T_0$ is the actual switching time period of the current switching cycle, and $t_{rs}$ is the reset time period of the current switching cycle.

40. The method of claim 27, further comprising:
rectifying an AC input voltage.

41. The method of claim 27, further comprising:
sensing a first stage current level with reference to the common potential.

42. The method of claim 27, wherein the first parameter is at least one of the following parameters: an input voltage level, a first capacitor voltage level, or a first stage current level.

43. The method of claim 27, further comprising:
sensing a second stage current level with reference to the common potential.

44. The method of claim 27, wherein the nonlinear load is a plurality of light emitting diodes.

45. The method of claim 27, further comprising:
varying the on-time duration comparatively slowly over a plurality of switching cycles to provide a power factor substantially close to one.

46. A system for power conversion, the system couplable to receive an input voltage, the system comprising:
a plurality of light emitting diodes;
a first power converter stage comprising a power switch, a first capacitor, and a first inductor, the first inductor having a first inductance;
a first sensor coupled to the first power converter stage and coupled to a common reference node, the first sensor adapted to sense a first parameter of the first power converter stage;
a second power converter stage coupled to the first power converter stage, the second power converter stage comprising a second inductor and a second capacitor, the second inductor having a second inductance, the second power converter stage coupled to the plurality of light emitting diodes to provide an output current to the plurality of light emitting diodes;
a second sensor coupled to the common reference node and to the plurality of light emitting diodes, the second sensor adapted to sense the output current level; and
a controller coupled to the power switch, the first sensor and the second sensor, the controller adapted to turn the power switch into an on state for an on-time duration substantially proportional to a ratio of the second inductance to the first inductance.

47. The system of claim 46, wherein the on-time duration is substantially proportional to either a square root of the ratio of the second inductance to the first inductance or to a square root of one-half of the ratio of the second inductance to the first inductance.

48. The system of claim 46, wherein a ratio of the on-time duration to an off-time duration is substantially constant and substantially proportional to either a square root of the ratio of the second inductance to the first inductance or a square root of one-half of the ratio of the second inductance to the first inductance.

49. The system of claim 46, wherein the first parameter is an input voltage level.

50. The apparatus of claim 49, wherein the system further comprises a third sensor coupled to the first power converter stage and adapted to sense a first capacitor voltage level, and wherein the controller is further adapted to determine a first error substantially as a difference between the input voltage level and the first capacitor voltage level, and to use the first error to adjust the on-time duration of a next switching cycle.

51. The system of claim 50, wherein the controller is further adapted to determine a second error substantially as a difference between the output current level and a predetermined output current level and to use the second error to adjust the on-time duration of the next switching cycle.

52. The system of claim 51, wherein the first error is determined in a comparatively fast feedback loop of the controller and the second error is determined in a comparatively slow feedback loop of the controller.

53. The system of claim 49, wherein the system further comprises a third sensor coupled to the first power converter stage and adapted to sense a first capacitor voltage level, and wherein the controller is further adapted to determine a voltage ratio of the input voltage level and the first capacitor voltage level, to determine a first error substantially as a difference between the voltage ratio and a predetermined ratio proportional to the first and second inductance, and to use the first error to adjust the on-time duration of a next switching cycle.

54. The apparatus of claim 49, wherein system further comprises a third sensor coupled to the first power converter stage and adapted to sense a first capacitor voltage level, and wherein the controller is further adapted to determine a voltage ratio of the input voltage level and the first capacitor voltage level, to determine a first error substantially as a difference between the voltage ratio and a predetermined ratio, and to use the first error to adjust the on-time duration of a next switching cycle, wherein the predetermined ratio is proportional to either a square root of the ratio of the second inductance to the first inductance or a square root of one-half of the ratio of the second inductance to the first inductance.

55. The system of claim 49, wherein the controller is further adapted to integrate the input voltage level, and when the integrated voltage level is substantially equal to a difference between the sensed output current level and a predetermined output current level, to turn the power switch into an off state for an off-time duration substantially proportional to a difference between the switching cycle time and the on-time duration.

56. The system of claim 46, wherein the controller is coupled to the power switch through a buffer circuit.

57. The system of claim 46, wherein a switching cycle time is substantially constant and substantially proportional to a minimum input voltage, wherein the minimum input voltage is substantially sufficient for both the first power converter stage and the second power converter stage to operate in a critical conduction mode.

58. The system of claim 46, wherein the controller is further adapted to maintain the output current provided by the second power converter stage between a first threshold and a second threshold by incrementing or decrementing a next on-time duration by an amount $\Delta t_{on}$, wherein $\Delta t_{on}$ is substantially proportional to $$\text{Int}\left[\frac{\beta}{n}t_{on}\right]+1,$$

in which $\beta$ is a numeric parameter, n is a number of switching cycles for the output current to change between the first and second thresholds, and $t_{on}$ is the current on-time duration.

59. The system of claim 46, wherein the apparatus further comprises a third sensor coupled to the second power converter stage and adapted to sense a second stage output current level, and wherein the controller is further adapted to turn the power switch into an off state when the sensed output current level has reached substantially a predetermined peak current level, to determine an actual on-time duration of the current cycle, and when the sensed second stage output current level has decreased substantially to zero, to determine an actual switching time period and reset time period of the current switching cycle.

60. The system of claim 46, wherein the controller is further adapted to determine the on-time duration $t_{on0}$ for a next switching cycle as substantially proportional to $$t_{on}\sqrt{\frac{2I_oT_0}{I_{ps}t_{rs}}},$$

where $t_{on}$ is the on-time duration of the current switching cycle, $I_O$ is a predetermined output current level, $I_{ps}$ is the predetermined peak current level, $T_0$ is the actual switching time period of the current switching cycle, and $t_{rs}$ is the reset time period of the current switching cycle.

61. The system of claim 46, wherein the first sensor is a first resistor and wherein the second sensor is a second resistor, and wherein the first and second resistors are coupled to the common reference node having a ground potential.

62. The system of claim 61, wherein the first power converter stage further comprises:
   a first diode couplable to an input voltage and coupled to the first inductor;
   a first capacitor coupled to the power switch; and
   wherein the power switch is coupled to the first inductor, the first capacitor, and the first resistor.

63. The system of claim 62, wherein the second power converter stage is coupled to the power switch through the first resistor.

64. The system of claim 63, wherein the second power converter stage further comprises:
   a second diode coupled to the second inductor;
   a second capacitor coupled to the second diode and couplable to the nonlinear load; and
   wherein the second resistor is coupled to the first resistor at the common reference node.

65. The system of claim 64, wherein the first power converter stage further comprises a third diode coupled between the first capacitor and the first inductor, and wherein the second power converter stage further comprises a fourth diode coupled between the second inductor and the first capacitor.

66. The system of claim 62, further comprising a rectifier coupled to the first diode, coupled to the common reference node, and couplable to receive an AC input voltage.

67. The system of claim 46, further comprising:
   a fourth sensor coupled to the power switch and adapted to sense a first stage current level.

68. The system of claim 46, wherein the first parameter is at least one of the following parameters: an input voltage level, a first capacitor voltage level, or a first stage current level.

69. The system of claim 46, further comprising:
   a fifth sensor coupled to the second inductor and adapted to sense a second stage current level.

70. An apparatus for power conversion, the apparatus couplable to a plurality of light emitting diodes and couplable to receive an input voltage, the apparatus comprising:
   a first power converter stage comprising:
      a power switch;
      a first capacitor coupled to the power switch;
      a first inductor coupled to the power switch, the first inductor having a first inductance; and
      a first diode couplable to the input voltage and coupled to the first inductor;
   a first resistor coupled to the power switch and coupled to a common reference node couplable to a ground potential;
   a second power converter stage coupled to the first power converter stage, the second power converter stage couplable to provide an output current to the plurality of light emitting diodes, the second power converter stage comprising:
      a second inductor having a second inductance;
      a second diode coupled to the second inductor and couplable to the plurality of light emitting diodes; and
      a second capacitor coupled to the second diode and couplable to the plurality of light emitting diodes;
   a second resistor coupled to the common reference node and couplable to the plurality of light emitting diodes; and
   a controller coupled to the power switch, the first resistor and the second resistor, the controller adapted to turn the power switch into an on state for an on-time duration substantially proportional to a ratio of the second inductance to the first inductance.

* * * * *